(12) United States Patent
Hartman et al.

(10) Patent No.: US 12,252,218 B1
(45) Date of Patent: *Mar. 18, 2025

(54) SYSTEMS AND METHODS OF RECOMMENDING CHANGES TO WAKEBOAT WAKE PERFORMANCE

(71) Applicant: Skier's Choice, Inc., Maryville, TN (US)

(72) Inventors: Richard Lawrence Hartman, Twin Lakes, ID (US); Matthew Douglas Brown, Friendsville, TN (US)

(73) Assignee: Skier's Choice, Inc., Maryville, TN (US)

( * ) Notice: Subject to any disclaimer, the term of this patent is extended or adjusted under 35 U.S.C. 154(b) by 376 days.

This patent is subject to a terminal disclaimer.

(21) Appl. No.: 17/804,140

(22) Filed: May 26, 2022

Related U.S. Application Data

(63) Continuation-in-part of application No. 16/750,430, filed on Jan. 23, 2020, now Pat. No. 11,753,116, (Continued)

(51) Int. Cl.
*B63B 1/32* (2006.01)
*B63B 34/75* (2020.01)
(Continued)

(52) U.S. Cl.
CPC ............... *B63B 1/32* (2013.01); *B63B 34/75* (2020.02); *B63B 39/061* (2013.01); *B63B 49/00* (2013.01);
(Continued)

(58) Field of Classification Search
CPC ......... B63B 1/32; B63B 34/75; B63B 39/061; B63B 49/00; B63B 32/40; F04D 13/12; Y02T 70/10
See application file for complete search history.

(56) References Cited

U.S. PATENT DOCUMENTS 6,012,408 A    1/2000   Castillo
6,427,616 B1   8/2002   Hagan
(Continued)

OTHER PUBLICATIONS

U.S. Appl. No. 13/543,659, filed Jul. 6, 2012.
U.S. Appl. No. 62/481,556, filed Apr. 4, 2017.

*Primary Examiner* — Richard M Camby
(74) *Attorney, Agent, or Firm* — McAfee & Taft

(57) ABSTRACT

A wakeboat that during operation creates a wake, the performance level of the wake varying depending upon the distribution of mass of and aboard the wakeboat, the wakeboat comprising: a hull; processing circuitry supported by the hull; a sensor configured to measure at least one parameter of the wakeboat, the sensor providing data to the processing circuitry, the processing circuitry configured to use the sensor data to derive the distribution of mass, the processing circuitry configured to use the distribution of mass to determine changes to the mass distribution which would yield a different wake performance level; and a display coupled to the processing circuitry, the processing circuitry being configured to use the display to indicate changes to the mass distribution which would yield the different wake performance level. Other systems and methods are also provided.

19 Claims, 13 Drawing Sheets

Related U.S. Application Data which is a continuation of application No. 15/916,511, filed on Mar. 9, 2018, now Pat. No. 10,577,054, which is a continuation of application No. 15/824,787, filed on Nov. 28, 2017, now Pat. No. 9,950,771.

(60) Provisional application No. 62/430,510, filed on Dec. 6, 2016.

(51) Int. Cl.
*B63B 39/06* (2006.01)
*B63B 49/00* (2006.01)
*B63B 32/40* (2020.01)
*F04D 13/12* (2006.01)

(52) U.S. Cl.
CPC .............. *B63B 32/40* (2020.02); *F04D 13/12* (2013.01); *Y02T 70/10* (2013.01)

(56) References Cited

U.S. PATENT DOCUMENTS

| | | |
|---|---|---|
| 7,856,937 B2 | 12/2010 | Chapdelaine |
| 8,798,825 B1 * | 8/2014 | Hartman .................. B63B 1/16 |
| | | 701/36 |
| 9,254,896 B2 | 2/2016 | Bertalan |
| 9,272,752 B1 | 3/2016 | Miller |
| 9,580,147 B2 | 2/2017 | Gasper |
| 9,611,006 B1 | 4/2017 | Miller |
| 9,669,903 B2 | 6/2017 | Gasper |
| 9,689,395 B2 | 6/2017 | Hartman |
| 9,694,873 B2 | 7/2017 | Gasper |
| 9,708,031 B1 | 7/2017 | Miller |
| 9,828,075 B1 | 11/2017 | Hartman |
| 9,950,771 B1 | 4/2018 | Hartman et al. |
| 10,577,054 B1 | 3/2020 | Hartman et al. |
| 2015/0053127 A1 * | 2/2015 | Bertalan ................. B63B 34/00 |
| | | 114/125 |
| 2017/0036738 A1 | 2/2017 | Hartman |

* cited by examiner

| | Example Effect of +50Kg Mass | | |
|---|---|---|---|
| | X / Lateral / Pitch | Y / Longitudinal / Roll | Z / Vertical / Yaw |
| Zone 1010 | +0.4 degree | 0 degree | 0 degree |
| Zone 1020 | +0.3 degree | -0.4 degree | 0 degree |
| Zone 1030 | 0 degree | +0.6 degree | 0 degree |
| Zone 1040 | -0.2 degree | +0.2 degree | 0 degree |
| Zone 1050 | -0.1 degree | 0 degree | 0 degree |
| Zone 1060 | -0.2 degree | -0.2 degree | 0 degree |
| Zone 1070 | -0.1 degree | -0.5 degree | 0 degree |

Figure 11

SYSTEMS AND METHODS OF RECOMMENDING CHANGES TO WAKEBOAT WAKE PERFORMANCE

CROSS-REFERENCE TO RELATED APPLICATION

This is a continuation-in-part of co-pending U.S. patent application Ser. No. 16/750,430, filed Jan. 3, 2020, which is continuation of U.S. patent application Ser. No. 15/916,511, filed Mar. 9, 2018 (now U.S. Pat. No. 10,577,054), which in turn is a continuation of U.S. patent application Ser. No. 15/824,787, filed Nov. 28, 2017 (now U.S. Pat. No. 9,950,771), which in turn claims priority to U.S. Provisional Patent Application Ser. No. 62/430,510 filed Dec. 6, 2016, all of which are incorporated herein by reference.

TECHNICAL FIELD

The present disclosure relates to watercraft, and in particular apparatus and methods for measuring the interaction of wakeboat hulls with their surrounding water; conveying information to the operator of wakeboats, and improving the safety and performance of wakeboats.

BACKGROUND

Watersports involving powered watercraft have enjoyed a long history. Waterskiing's decades-long popularity spawned the creation of specialized watercraft designed specifically for the sport. Such "skiboats" are optimized to minimize the wake in the water behind the watercraft's hull, thereby providing the smoothest possible water to the trailing water skier.

More recently, watersports have arisen at the other extreme, by actually taking advantage of, and benefitting from, the wake produced by a watercraft. Sports such as wakesurfing, wakeboarding, wakeskating, kneeboarding, and others use the watercraft's wake to allow the participants to perform various maneuvers or "tricks" including becoming airborne.

To address this changing market, skiboats dedicated to a single watersport have yielded to a new type of watercraft known as a "wakeboat". Wakeboats seek to more completely manage the spectrum of wakes that are produced behind the hull—diminishing it for some activities, while enhancing it for others.

Many techniques have evolved to manipulate the wake produced by the hull of a wakeboat. One method, as described by U.S. Pat. No. 6,427,616 to Hagan and incorporated herein by reference, is to selectively pump water aboard the wakeboat to act as ballast, changing the mass of the wakeboat and thus the displacement and draft (depth in the surrounding water) of its hull. The amount of ballast is often measured and recorded, on the theory that a desirable wake can be reproduced by duplicating the ballast amounts.

Another approach is to use hydrofoils (sometimes characterized as "wings"), trim tabs/plates, water diverters, or other hydrodynamic control surfaces to selectively change the effective mass of the wakeboat as it moves in water. (While hydrofoils and trim tabs/plates have historically been used to elevate the hull, in wakeboat applications these control surfaces are sometimes inverted to yield the opposite effect.) Parameters such as control surface depth and angle are often measured and recorded, again in the hopes of recreating a desirable result on demand.

Semi-permanent features, such as the presence and amount of lead, other metals, sandbags, and other heavy objects are also used to affect the wake or wave behind the hull.

Ballast, control surfaces, weight bags, and the like are not the only variables affecting the relationship of the hull to the surrounding water. Other parameters such as the number and weight of passengers, amount of fuel, amount of equipment, and supplies such as food and potable water all contribute. Some wakeboats even employ specially shaped hulls to increase or decrease their displacement, and hence their effective mass, while moving through water. It is the aggregate of these variables, and their effects on the hull, that determine the wake or wave that forms behind it.

Unfortunately, this aggregation and the resulting interactions are not obvious, nor easily understood, nor manageable by the operator of the wakeboat. There has been no concise, convenient method to summarize this information and convey it to the operator. The result has been often vain attempts by operators to roughly estimate this information and then apply that estimation, via experimentation, to the watercraft on a day-by-day basis. The inability to accurately reproduce a desired wake or wave as all of the estimated variables change—often during the course of a single day—is a large source of frustration for watercraft operators, dealers, manufacturers, and the wakeboat industry in general.

The present disclosure provides apparatus and methods that enable the operator to more accurately control the wakes and waves produced by the wakeboat.

BRIEF DESCRIPTION OF THE VIEWS OF THE DRAWINGS

FIG. 11 is a table illustrating the effects on pitch, roll, and yaw, of adding to zones shown in FIGS. 9 and 10 according to some embodiments.

DETAILED DESCRIPTION OF THE ILLUSTRATED EMBODIMENTS

Figure 1:
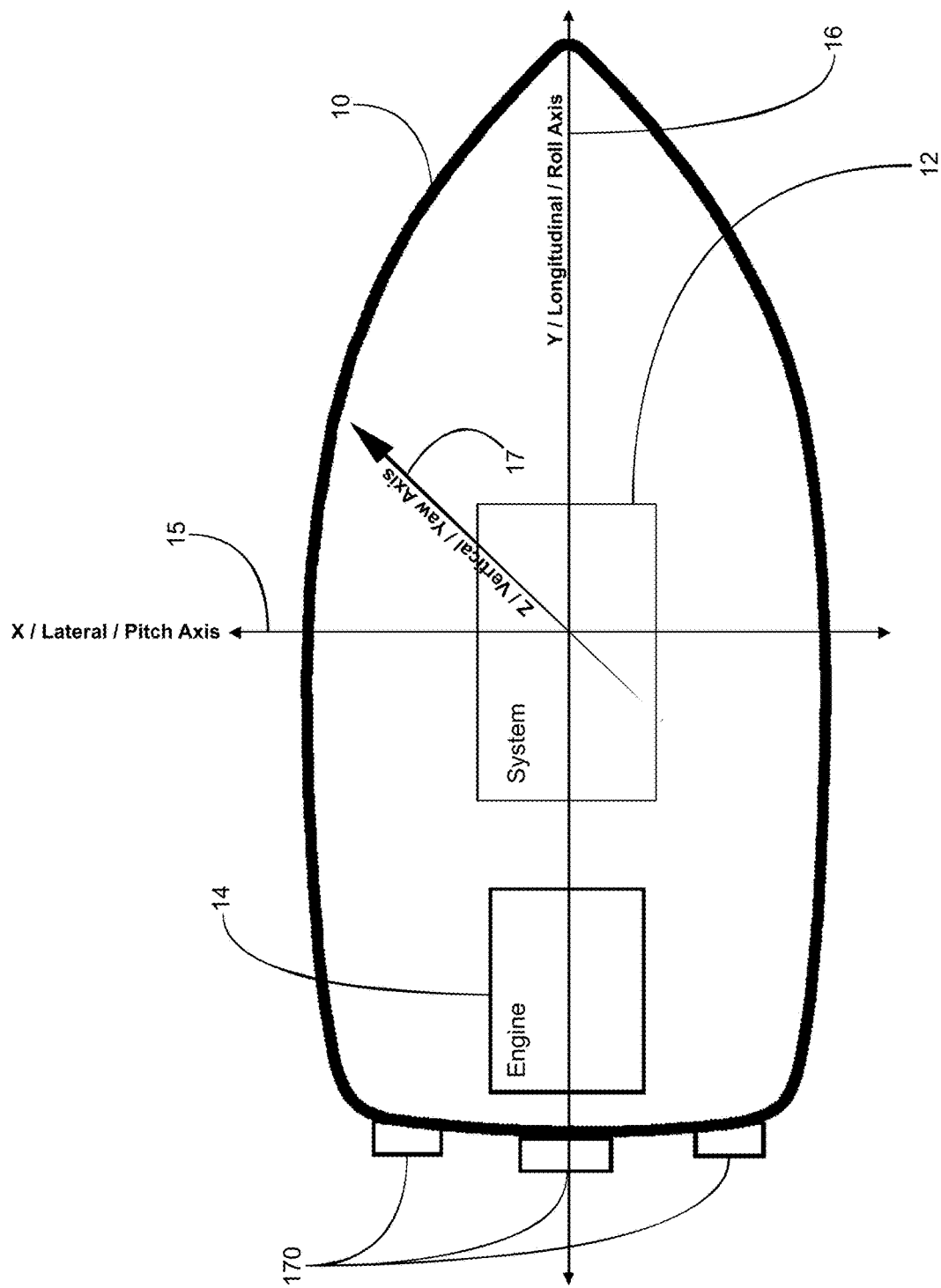
FIG. 1 illustrates a wakeboat according to some embodiments of the disclosure.

This disclosure is submitted in furtherance of the constitutional purposes of the U.S. Patent Laws "to promote the progress of science and useful arts" (Article 1, Section 8).

Attention is directed towards the following patent applications, all of which are incorporated herein by reference: Ser. Nos. 13/543,659; 14/658,980; and 62/201,030. Attention is also directed towards U.S. Pat. No. 8,798,825, issued Aug. 5, 2014 to Hartman, which is also incorporated herein by reference.

The assemblies and methods of the present disclosure will be described with reference to FIGS. 1-13.

The hull of a watercraft produces a wake as it proceeds through the water. Participants in watersports have different needs and preferences with respect to the size, shape, and orientation of such a wake.

A variety of techniques for creating, minimizing, enhancing, and generally controlling a wakeboat's wake have been developed and marketed with varying degrees of success. As described earlier herein, these include but are not limited to ballast systems, control surfaces, semi-permanent weights, and specially shaped hulls.

These approaches are based on the fact that the displacement of the hull of the wakeboat in the water is related to the magnitude of the wake it produces. Displacement, in turn, is driven by the mass of the wakeboat and its cargo. By varying actual mass (through the addition or removal of such things as ballast and semi-permanent weights) and/or what might be termed "artificial" mass (via the effects on displacement caused by control surfaces 170), the effective mass of the hull can be modulated and the resulting wake behind the hull can be modulated as well.

For a given wakeboat design, parameters such as the maximum amount of water ballast and the degree of control surface deployment can be measured, stored, and reproduced. Were these the only parameters affecting the mass of a wakeboat, and thus affecting the resulting wake, the goal of on-demand wake duplication would be straightforward.

However, there are other factors that affect the mass of a wakeboat. An abbreviated and incomplete list includes the number and size of passengers, fuel, personal equipment, food, and potable water. These factors, and more, serve to vary the mass of a wakeboat from day to day, and even session to session within the same day.

Recognizing the presence of these variables and their effect on wakeboat mass, it becomes clear why wake duplication has so challenged the wakesport industry. The substantial investment of time and effort to measure and display such things as ballast and control surfaces ignores these other variables. To display "percentages" and "angles" without also incorporating the effect of these other variables yields a false sense of accuracy and control.

This is confirmed by the frustration expressed by wakeboat owners and operators. From one day to another, the "displayed" values will be identical yet the results behind the boat can be wildly disparate.

Various embodiments of the present disclosure address these problems by accounting for these missing variables, delivering the aggregated information to the wakeboat operator, and enabling the operator to use this newly available information to achieve the desired performance and behavior of the wakeboat and the wake it produces.

To achieve a specific level of performance from the wake produced by a wakeboat, it is first necessary to know the potential range that is available. As noted above, the magnitude of the wake is driven by the displacement of the wakeboat, which in turn is driven by the mass of the wakeboat plus its cargo. Lower mass leads to reduced displacement, which leads to a wake of lesser magnitude. Likewise, higher mass leads to increased displacement, which leads to a wake of greater magnitude.

The minimum mass of a wakeboat could be defined as having only the factory installed permanent fixtures, zero fuel, no passengers, no personal equipment, no ballast, etc. In other words, a wakeboat stripped to its bare essentials. Having minimum mass, such a wakeboat would have minimum displacement and yield its minimum wake for those watersports that benefit from smoother water Maximizing the mass of a wakeboat is more nebulous. Some things are obvious, such as a full fuel tank and full ballast compartments. But "maximum mass" is where the aforementioned variables come into play, and where the industry frustration has originated.

Consider the following scenario: A wakeboat operator invites a group of eight adult friends for a day of wakesports. They maximize their ballast to obtain the largest possible wake, and find the resulting wake to be quite desirable. The wakeboat operator notes the ballast settings of this desirable, "maximum" wake so that it can be duplicated at some future time.

Encouraged by this success, the wakeboat operator takes his spouse and two small children out the next day to duplicate this desirable "maximum" wake. The operator duplicates the ballast settings of the day before. Unfortunately, the result is underwhelming; the wake is a different size, a different shape, and entirely unsatisfactory for their intended purpose.

What to do? The ballast is already maximized. The settings are identical. The reasonable expectation that "If the settings are the same, the wake will be the same" has instead led to disappointment and embarrassment in front of his family.

In this scenario, the problem is that the (displayed) settings do not incorporate the variable mass of the passengers. On the first day, the cumulative mass of nine adults could be 1200-1600 pounds. But on the second day, the cumulative mass of the operator's three family members might be under 500 pounds. A change of 1000 pounds is very significant; for some wakeboats that is equivalent to losing half of the ballast. Yet the ballast indicators, and other displays, provide no insight into this fundamental problem. The operator is left frustrated, embarrassed, and angry.

It is unrealistic for a wakeboat operator to expect to duplicate a wake that benefits from 1000 extra pounds of mass when that extra mass is absent. However, it is also unrealistic (and commercially detrimental) to restrict a wakeboat to only produce the wakes that are "always possible" regardless of variable conditions. A given wakeboat may have a wide range potential range of performance; the entirety of that potential may not always be achievable at any given moment, but all of that potential should be made available if conditions allow.

Similarly, just because a given maximum potential is available does not mean that maximum is always desired. For example, a maximum possible wake may be desirable when the operator or other adult is participating in wakesports behind the boat. In contrast, a much smaller wake may be necessary (should a child wish to begin learning a watersport on that same day) or desirable (if the activity changes to a low-wake watersport such as the aforementioned waterskiing).

From the above, it is clear that there are three relevant parameters: 1) The maximum potential performance range of the wakeboat, defined by its minimum and maximum performance levels; 2) the performance range that is presently available given current conditions; and 3) the actual performance level within that range that is presently selected.

Various embodiments of the present disclosure provide systems and methods to clearly and concisely communicate these parameters to the wakeboat operator. This helps make the operator aware of the total potential range available under the right conditions, the potential range available at the moment, and the potential level within the latter range that the operator's choice of settings now establishes. In turn, various embodiments thus assist the operator in optimizing the performance of the wakeboat under present conditions, and inform the operator that the wakeboat may be capable of delivering different performance under different conditions.

FIG. 1 illustrates a wakeboat 10 in accordance with various embodiments of the present disclosure. The wakeboat 10 includes a system 12 to measure parameters of the wakeboat 10, to adjust the amount of wake generated, for receiving inputs from an operator of the wakeboat 10, and to display information for the operator of the wakeboat 10 concerning operation of the wakeboat. Wakeboat 10 also comprises an engine 14 to power the wakeboat, and optionally a number of hydrofoils, trim tabs/plates, water diverters, or other hydrodynamic control surfaces 170 which can selectively change the effective mass of the wakeboat as it moves in water.

Figure 2:
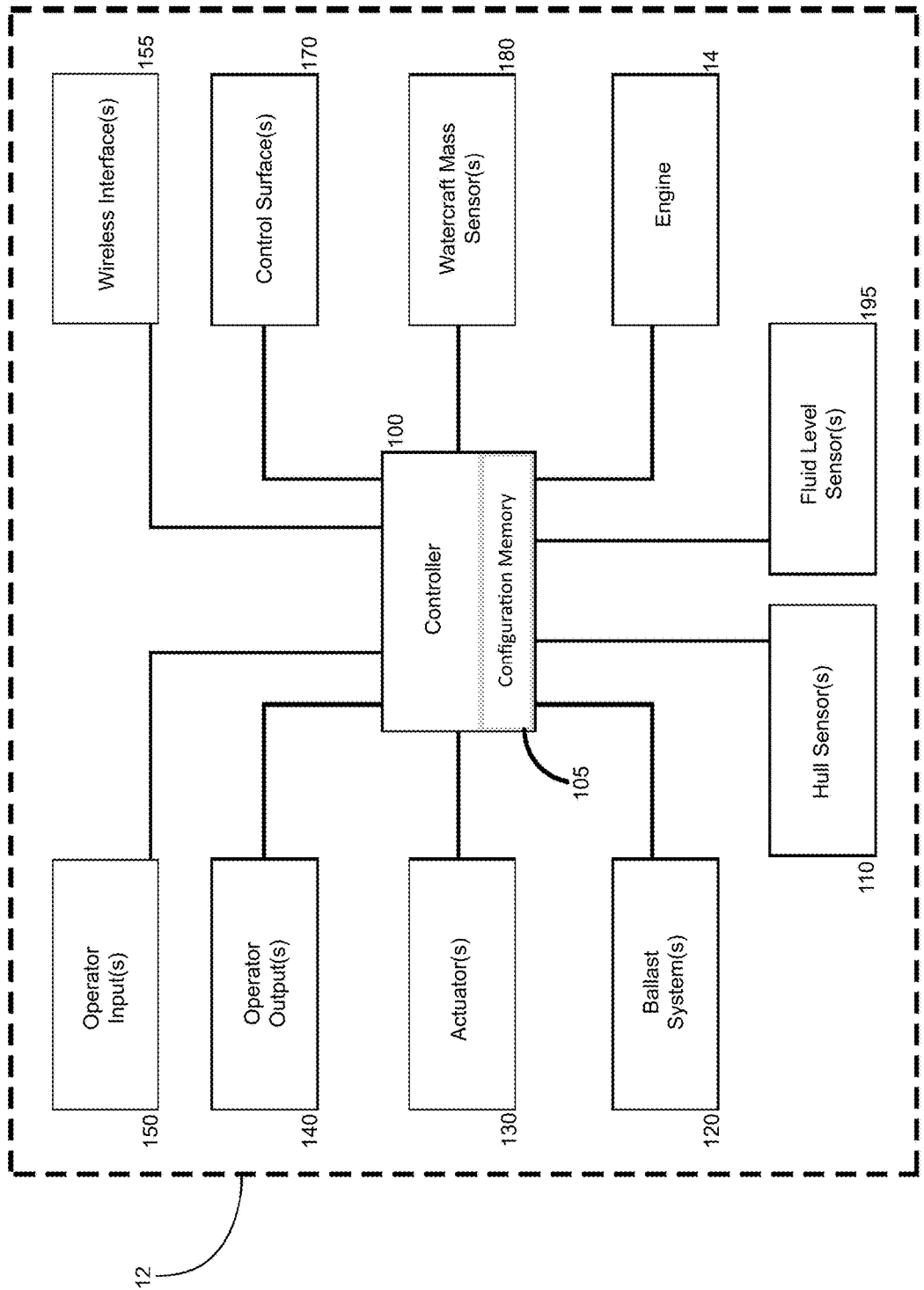
FIG. 2 illustrates a configuration of a wakeboat management system included in the wakeboat of FIG. 1, according to some embodiments of the disclosure.

As shown in FIG. 2, system 12 includes a controller 100. In some embodiments, the controller 100 includes processing circuitry such as microprocessors, logic, memories, programmable gate arrays or other field-configurable devices, and other digital electronic components. Such processing circuitry may also include analog circuitry including amplifiers, filters, digital-to-analog and analog-to-digital converters, and related components.

In some embodiments, the controller 100 includes electromechanical devices such as relays or their solid-state equivalents, switches, potentiometers, and similar components. In some embodiments, the controller 100 further includes power supply and conditioning components and connectors for various cables and memory devices. Analog or digital inputs may be configured with the processing circuitry of controller 100 to allow various parameters to be monitored.

In some embodiments, controller 100 also includes one or more wireless interfaces 155 to communicate wirelessly with other components, systems, or subsystems whether permanently on board the watercraft or temporarily present.

Such wireless communications could be with portable electronic devices such as cellphones or tablets to enable passengers to interact with controller 100 in various ways. As just one example, some embodiments of the present disclosure allow controller 100 to use wireless interface(s) 155 transmit wakeboat configuration data to handheld devices. Some embodiments also support the reception by controller 100, using wireless interface(s) 155, of wakeboat configuration data from personal electronic devices. One application for this latter ability allows passengers to bring their preferred configuration along with them when visiting a friend's wakeboat, easily transferring that data to controller 100 instead of requiring the passenger or the wakeboat operator to manually type in the information.

Controller 100 may interact with some or all of the various other components, systems, and subsystems of system 12, if and when present on the wakeboat 10. System 12 selectively comprises any quantity of any of the following: hull sensors 110 such as draft, velocity, depth of water below the hull, heading, bearing, and angles of roll/pitch/yaw; ballast systems 120 for increasing or decreasing mass on the wakeboat 10; actuators 130 run by electricity, hydraulics, pneumatics, or other power sources; operator outputs 140 such as analog and digital gauges, graphical screens, indicators, lights, and acoustic transducers; operator inputs 150 such as touchscreens, switches, buttons, and knobs; wireless interfaces 155; hydrodynamic control surfaces 170; watercraft mass sensors 180; engine 14 and associated parameters such as RPM, temperatures, pressures, control settings such as throttle percentage, and fuel flow rates; and fuel, water, and other fluid level sensors 195.

Any number of these components and subsystems may have unidirectional or bidirectional data exchange with controller 100 as appropriate to the specific application. Thus, as just one example, control surface(s) 170 may accept data from controller 100 for parameters such as deployment and/or (re) positioning, and may send data to controller 100 to report parameters such as angle of deployment, pressure, and temperature. Likewise, ballast systems 120 may accept data from controller 100 to control filling and draining of ballast compartments, and may send data to controller 100 to report parameters such as amounts of ballast in various ballast compartments, flow rates, and other pertinent information.

In implementing certain embodiments of the present disclosure, controller 100 receives information from the various sensors, subsystems, and components. Controller 100 processes this information and selectively takes action to display information, send information or instructions to other subsystems and components, accept information and instruction from the operator of the wakeboat, and other operations as suited to the specifics of the application.

Figure 3:
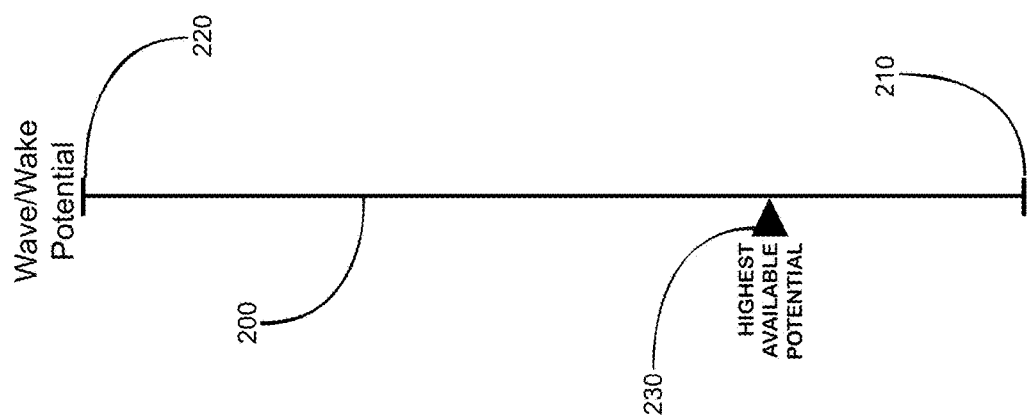
FIG. 3 illustrates a display of wakeboat operational characteristics according to some embodiments of the disclosure.

FIG. 3 illustrates an information display used in some embodiments of the present disclosure. Graph 200 shows the full range of wave/wake potential that is available from this wakeboat 10, from Minimum Potential 210 to Maximum Potential 220. Graph 200 and the associated elements described herein could be presented, for example, on operator outputs 140 of FIG. 2 as part of a graphical screen, an array of discrete visual/audible/tactile indicators, an analog gauge, or other representation appropriate to the specific application.

Continuing with FIG. 3, controller 100 is configured to let Minimum Potential 210 on graph 200 represent minimum wakeboat mass, which yields minimum displacement and thus the smallest wake. In some embodiments, Minimum Potential 210 would also include the effects of any displacement-offsetting accessories such as control surfaces 170 when deployed in that manner.

Controller 100 is also configured to let Maximum Potential 220 on graph 200 represent the maximum recommended mass for a given wakeboat including maximum passenger load, maximum ballast load, maximum fuel load, maximum equipment load, maximum additional semi-permanent ballast load, maximum "equivalent ballast" from displacement-enhancing control surfaces, and so forth. The specific definition of this value may vary, but a typical limit might be the amount of mass beyond which safe operation of the wakeboat 10 cannot be assured. In some embodiments, this maximum mass is set by the manufacturer of the wakeboat 10, and cannot be changed by the operator. In other embodiments, the maximum mass may be changed either automatically by controller 100, or manually by operators and/or service personnel, in response to changing conditions.

Controller 100 uses Highest Available Potential Indicator 230 to reflect the maximum available wave/wake potential under present conditions. While Maximum Potential 220 yields the largest wave or wake, as revealed in the above scenario a wakeboat cannot always achieve its maximum displacement even when its ballast, control surfaces, and other displacement-enhancing tools are fully deployed. In such situations, controller 100 will position Highest Available Potential Indicator 230 somewhat below Maximum Potential 220 and inform the operator not only of the performance that is presently available, but that even more potential is available from the wakeboat if suitable changes were to be made.

An example using specific numbers will now be provided, by way of example only. Consider a wakeboat whose minimum operational mass is 4000 pounds, equipped with a ballast system that can bring aboard an additional 2000 pounds. Presuming for this example that the manufacturer recommends that the maximum safe mass of the wakeboat is 8500 pounds, then up to 2500 pounds of cargo can be carried in addition to the basic 4000 pounds plus 2000 pounds of ballast.

In this example, controller 100 uses, for example, Minimum Potential 210 to represent 4000 pounds and Maximum Potential 220 to represent 8500 pounds. The range between Minimum Potential 210 and Maximum Potential 220 is thus 4500 pounds. Controller 100 is configured with a ballast range of 0 to 2000 pounds, meaning that selective use of the ballast could optionally add mass in that range to the mass of the wakeboat.

Continuing with this example, in a quiescent state with ballast drained, Highest Available Potential Indicator 230 could indicate roughly 44% of full scale. (2000 pounds of optional ballast is 44% of the 4500 pounds represented by the full dynamic range of graph 200 in this example.)

This 44% indication by Highest Available Potential Indicator 230 represents the maximum potential displacement of the wakeboat—not what the wakeboat might be actually displacing at that moment. Highest Available Potential Indicator 230 informs the operator of what is possible.

Next, presume that fuel is added. Fuel has mass and adds weight. If 300 pounds of fuel were added, controller 100 becomes aware of that in a variety of ways, in various embodiments, directly via a level sensor 200 of FIG. 2 associated with the fuel tank; indirectly via a vessel mass sensor 180 or a hull draft sensor 110, both of FIG. 2; or any other technique that suits the specifics of the application.

Upon becoming aware of the additional fuel, controller 100 can recalculate the mass of the wakeboat as now being 2300 pounds out of 4500, or 51%, and Highest Available Potential Indicator 230 would move accordingly. Again, Highest Available Potential Indicator 230 represents the maximum potential displacement of the wakeboat (fixed mass of 4000, plus the added fuel of 300, plus up to 2000 pounds of ballast, for example). Since 300 pounds of fuel have been added, the maximum potential displacement has moved from 44% to 51% of the full scale shown by graph 200.

At some point in time, passengers board the wakeboat. In keeping with the example earlier herein, presume the operator and eight adult friends are on board. If the adults average 175 pounds each, this adds another 1575 pounds of mass. This change can be communicated to controller 100 in any suitable fashion, including but not limited to indirect sensing (such as a hull draft sensor 110 of FIG. 2 since increased mass increases displacement, which in turn increases hull draft); direct sensing (a vessel mass sensor 180 of FIG. 2); operator manual entry via operator inputs 150 of FIG. 2; or any other technique that suits the specifics of the application.

With 2000 pounds of optional ballast, plus 300 pounds of fuel, plus 1575 pounds of passengers, controller 100 repositions Highest Available Potential Indicator 230 to roughly 86% of full scale to represent the 3875 total pounds, both present and optional, above the wakeboat's minimum operational mass as indicated by Minimum Potential 210. (Once more: 1875 of those pounds are already present, and another 2000 pounds can be optionally added via the ballast system, so the total amount of mass available is 86% of the maximum, or 3875 pounds.)

By observing the display of this embodiment of the present disclosure, the operator can immediately see that 1) more than three quarters of the wakeboat's potential performance is available given present conditions, and 2) there is still untapped performance which could be realized if Highest Available Potential Indicator 230 were brought up to Maximum Potential 220 by the addition of more mass.

Thus, in various embodiments, operators no longer need wonder how much of their wakeboat's potential they have access to, nor how much untapped potential might be available, nor how to reach that untapped potential. System 12 makes all of that information immediately available so the operator can make informed decisions about its safe and optimal operation.

Various embodiments also provide enhanced safety. Too often, operators blindly add more and more ballast (in the form of accessory ballast bags, weights of lead or other metals, and the like) as they seek maximum performance from their wakeboat. Lacking any indication of where they actually are in the operational envelope of the wakeboat in question, excessive ballast can quickly lead to a dangerous overweight situation. Some embodiments of the present disclosure enable operators to know when their wakeboat has untapped potential, and to know when they have added sufficient (but not dangerously excessive) additional ballast to reach that potential.

Some embodiments also selectively warn the operator when the total mass or the angle of hull rotation, as measured by hull sensors 110, reaches or exceeds safety limits. Some embodiments can selectively and automatically adjust ballast systems 120 or actuators 130 or control surface(s) 170 alone or in combination to keep the hull rotation or total mass within safety limits. In some embodiments the operator is given the option to acknowledge and override such warnings and adjustments, preserving the operator's ability to make the final—but informed—decision.

Continuing with the earlier example, presume the operator and the operator's family use the wakeboat 10 on a subsequent day. Presuming fuel and all else are equal, passenger mass might drop from 1575 to (175 operator+150 spouse+75 child+75 child=) 475 pounds. Mass above Minimum Potential 210 is thus (2000 optional ballast+300 fuel+475 passengers=) 2775 pounds, which is 62% of graph 200's full dynamic range of 4500 pounds. Controller 100 positions Highest Available Potential Indicator 230 to 62% with the family instead of 86% with the nine adult friends of the day before.

Recall that the operator was left confused, embarrassed, and angry that the previous day's settings did not yield an identical wave or wake behind the wakeboat for the family outing. But with suitable embodiments of the present disclosure, it is immediately clear that while the group of adults allowed the wakeboat to realize 86% of its potential, the reduced mass of the family allows the wakeboat to realize just 62% of its potential. The operator is no longer lost in an absence of information, and can make informed decisions.

Should the operator truly wish to duplicate the maximum potential of the earlier day, various embodiments of the present disclosure make that straightforward as well. No longer is it a question of how much additional ballast to add, or whether doing so has created a dangerous situation. System 12 provides an immediate indication of the conditions aboard the wakeboat 10; adding mass to bring Highest Available Potential Indicator 230 to the same 86% as the earlier day substitutes for the missing mass of the adult friends.

Figure 4:
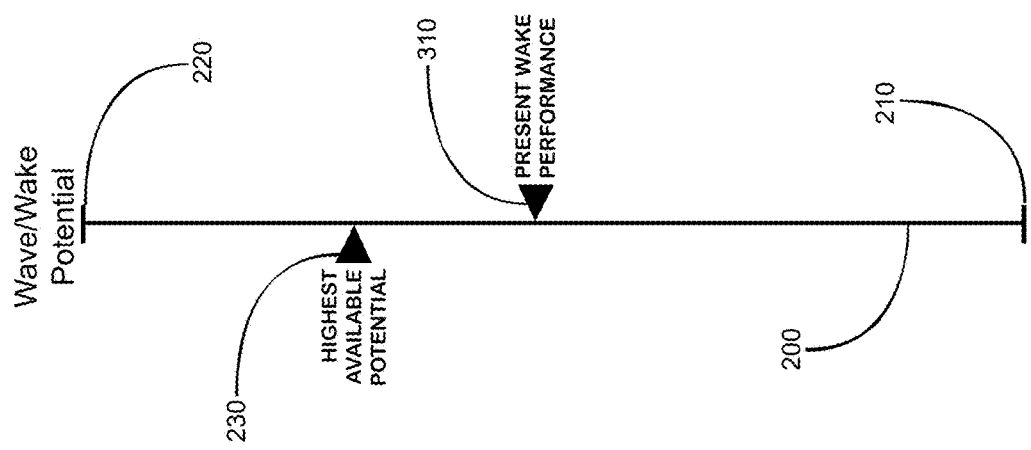
FIG. 4 illustrates another display of wakeboat operational characteristics according to some embodiments of the disclosure.

FIG. 4 illustrates another embodiment of the present disclosure. Graph 200, Minimum Potential 210, Maximum Potential 220, and Highest Available Potential Indicator 230 from FIG. 3 are present. Current Performance Indicator 310 represents the presently configured performance level of the wakeboat.

As described earlier, Highest Available Potential Indicator 230 informs the operator of the maximum potential of the wakeboat. This leaves open the question of how the wakeboat is actually configured within the range between Minimum Potential 210 and Highest Available Potential Indicator 230.

In the above examples, Highest Available Potential Indicator 230 indicated 86% and 55% of the full scale of graph 200. No indication was provided of where the wakeboat was presently configured within that available potential. In FIG. 4, Current Performance Indicator 310 fills this need.

Continuing with an earlier example for familiarity, the adult group yielded an available potential 230 of 86%, derived from 1575 pounds of passengers, 300 pounds of fuel, and (up to) 2000 pounds of (optional) ballast. But unless ballast is added, the actual mass above Minimum Potential 210 is actually (1575+300=) 1875 pounds.

FIG. 4 makes this information available to the operator. Highest Available Potential Indicator 230 indicates 86% of the wakeboat's maximum potential could be available. But Current Performance Indicator 310 indicates the actual, present condition: 42%, which is 1875 pounds out of the full scale 4500 pound dynamic range of graph 200.

If the operator were to begin filling the ballast compartments, controller 100 would begin to reposition Current Performance Indicator 310 upward, indicating the increasing present performance that results from increased wakeboat mass. If 1000 pounds of ballast were added, Current Performance Indicator 310 would rise from its earlier 42% to 64% (1575+300+1000=2875 out of 4500 pounds full scale). Note, however, that filling the ballast would not change Highest Available Potential Indicator 230 because its reading already incorporates the potential mass of the optional ballast, whether that ballast is onboard or not.

Consider what would happen if the ballast were filled to its capacity of 2000 pounds: Current Performance Indicator 310 would rise to 86%. Current Performance Indicator 310 would then be equal to Highest Available Potential Indicator 230, as expected since the entire available performance of the wakeboat is being realized.

As the above scenario illustrates, this embodiment of the present disclosure solves the problem of operator confusion and lack of information with respect to a wakeboat's 1) available potential and 2) present performance. Wakeboat operation and safety are thus dramatically enhanced.

Some embodiments solve the problem of duplicating midrange performance levels, even under changing conditions.

Resuming with the family scenario of two adults and two children: Highest Available Potential Indicator 230 showed 62% (derived from 2000 optional ballast+300 fuel+475 passengers). At the start, with ballast empty, Current Performance Indicator 310 would indicate 17% (300+475=775 out of 4500 full scale). To realize the available potential of 62%, the ballast could be filled to add 2000 pounds and raise the mass to (2000+300+475=) 2775 pounds. That figure is 62% of the full scale 4500 pounds, and (predictably) matches the 62% of Highest Available Potential Indicator 230.

Sometimes, as noted earlier, the goal is not always to maximize the size of the wake. Sometimes reduced performance is actually preferable, as for activities that benefit from a minimal wake such as waterskiing or tubing, or when beginners can benefit from a less extreme learning environment.

Starting at the 17% present performance level in the family scenario noted above, the operator could add a subset of total ballast capacity—say, 25% or 500 pounds—as a starting point for a beginner. Current Performance Indicator 310 would then move to 28% (500+300+475=1275 out of 4500). A few tweaks later, as the wave or wake was "dialed in" to suit the preferences and advancements of the beginner, Current Performance Indicator 310 might report 45%. That 45% performance value could then be duplicated during future sessions, replicating the conditions that the beginning participant last experienced.

Even more striking is that suitable embodiments of the present disclosure enable that 45% to be duplicated with wildly different conditions. Consider the original example of nine adults, a very different mass/displacement situation from the family scenario. Without ballast, Current Performance Indicator 310 reported 42%. By adding a small amount of ballast, the operator can accurately duplicate the 45% performance level from the family scenario—with an entirely different passenger environment. Far less ballast is required, of course, due to the increased "human ballast" aboard the wakeboat. But without system 12, the operator remains stranded in today's situation: Blind experimentation that usually ends in failure, frustration, and embarrassment.

A further enhancement, provided by some embodiments of the present disclosure, is the ability of controller 100 to store the value represented by Current Performance Indicator 310 in a configuration memory 105 and later recall it for automated or semi-automated duplication. While the operator may at times prefer to "dial in" the wakeboat's performance manually, it is often convenient to recall a previously stored configuration and let controller 100 adjust the various parameters of the wakeboat to restore that configuration. Considering the many variables involved including passenger count and weight, fuel load, and ballast amounts—and how those may all be different on different days, or even at different times of the same day—allowing controller 100 to restore a previous value represented by Current Performance Indicator 310 via selective manipulation of the associated wakeboat parameters can significantly reduce the workload on the wakeboat operator.

Some embodiments of the present disclosure may store the value represented by Current Performance Indicator 310 in configuration memory 105 together with many other configurable aspects of the wakeboat's operation including but not limited to control surface parameters, and/or hull speed, Such memorized configurations may be identified by a configurable identifier which can be the name of the individual preferring those settings ("John", "Mary", etc.), the name of the activity for which those settings are intended ("wakesurfing", "slalom", etc.), or other mnemonics suitable to the specific application.

In some embodiments of the present disclosure, system 12 can selectively add or remove ballast automatically to maintain a target performance level. For example, as one wakesports participant re-enters the wakeboat 10 and is replaced by another, controller 100 can compensate for the difference in their body masses. Other changes that affect vessel mass, such as fuel consumption or the addition or departure of passengers, can also be accommodated automatically.

A further advantage of various embodiments is the ability to determine that a given performance level is not achievable under present conditions. In the adult passenger scenario above, the lowest possible performance level (all nine adults aboard, no ballast) was 42%. If the operator knew of a desirable wave or wake that required, say, the 30% performance level, the operator would know immediately that a 30% performance level was unachievable given the present passenger loading. Instead of being condemned to today's process of duplicating ballast settings, control surface settings, and the like in a vain attempt to achieve the unachievable, various embodiments of the present disclosure reports the situation and the operator can make an informed decision (perhaps temporarily dropping off 1-2 adult participants to reduce mass).

This advantage holds true at the top end of the operating envelope as well. If a desirable wave or wake requires a 85% performance level, suitable embodiments of the present disclosure make it clear to the operator that, in the family scenario above, an 85% performance level is not achievable (because Highest Available Potential Indicator 230 indicates 62%). Likewise, in the adult scenario with its 86% available performance, the operator would know that an 85% performance level is indeed within the available performance range.

Thus, various embodiments provide accurate measurement and duplication of waves and wakes at every performance level.

Figure 5:
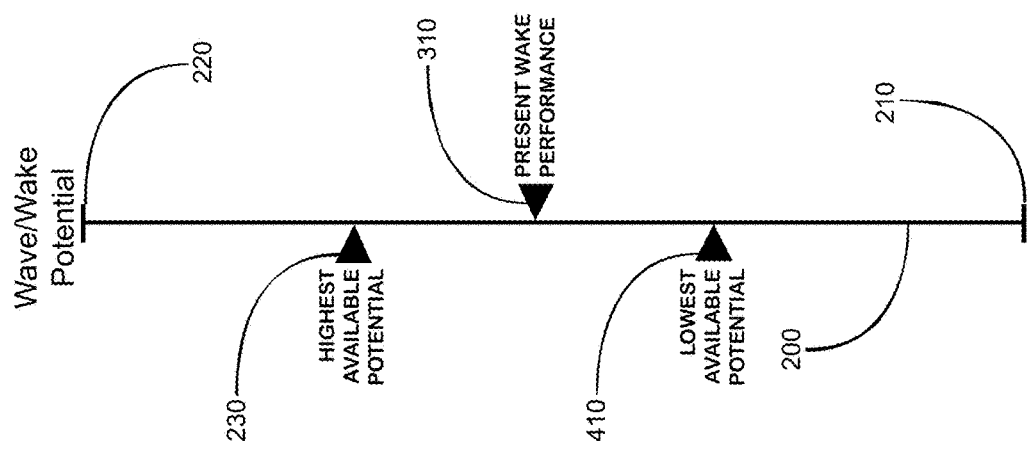
FIG. 5 illustrates a further display of wakeboat operational characteristics according to some embodiments of the disclosure.

FIG. 5 illustrates a further display configuration, as realized by some embodiments of the present disclosure. Graph 200, Minimum Potential 210, Maximum Potential 220, and Highest Available Potential Indicator 230 from FIG. 3 are present, as is Current Performance Indicator 310 from FIG. 4.

As explained above, available potential indicator 230 reflects the maximum available performance given present conditions. However, the amount of transient mass (such as passengers, fuel, or equipment) may also impose a minimum available performance that is greater than Minimum Potential 210.

In the adult passenger examples above, the wakeboat's minimum operational mass is 4000 pounds as represented by Minimum Potential 210. When nine adults and 300 pounds of fuel are added, the minimum mass increases to (4000+300+1575=) 5875 pounds and Highest Available Potential Indicator 230 moves to 42% on graph 200.

As in the examples above, ballast and control surfaces and other features may be used to change the effective mass, but there may be no way to reduce the effective mass of the wakeboat below this 42% figure. In that case, the dynamic range for effective wakeboat mass will be limited not only by the value represented by Highest Available Potential Indicator 230 on the top end, but also by this minimum value imposed on the bottom end. In other words, the loading of the wakeboat may make it impossible to achieve a present performance level below the baseline value.

FIG. 5 illustrates how some embodiments of the present disclosure can display this information to the operator. Lowest Available Potential Indicator 410 reflects the lowest performance level attainable by the wakeboat given its present conditions.

In the above adult passenger example, Lowest Available Potential Indicator 410 would move to 42%. Highest Available Potential Indicator 230 would represent 86%. Current Performance Indicator 310 would start at the same 42% as Lowest Available Potential Indicator 410, then rise and fall as ballast and control surfaces and other features are adjusted. In some embodiments, the movement range of Current Performance Indicator 310 would be bounded by Highest Available Potential Indicator 230 and Lowest Available Potential Indicator 410, because those respectively indicate the maximum and minimum wakeboat mass available under present conditions.

By way of review, upon the addition of fuel, controller 100 would adjust Lowest Available Potential Indicator 410 upward just as Highest Available Potential Indicator 230 would be adjusted upward. Both levels, and thus both indicators, are affected by the maximum potential mass of the wakeboat. The addition of fuel increases the mass, and thus raises the highest available potential level (e.g. the highest potential can be greater than before the fuel was added) and also raises the lowest available potential level (e.g. the lowest potential cannot descend as low as before the fuel mass was added). This can be thought of as a "shift" in the available performance range of the wakeboat.

Current Performance Indicator 310 also reflects the increased mass of the added fuel. If the wakeboat operator (or controller 100 if in an automated mode of operation) wishes to maintain the previous wake performance level (and thus move Current Performance Indicator 310 back to its previous value), an equivalent amount of mass must be removed to offset the mass of the fuel—perhaps using ballast system(s) 120 if ballast is present, or by adjustments to control surfaces 170 to offset the new mass when the hull is moving in water. Such an adjustment would allow the potential performance range to shift without affecting the present performance level.

This scenario highlights a distinction between the types of mass that can affect the performance of the wakeboat. Changes to "fixed" masses, such as the mass of the wakeboat itself and passengers and fuel and equipment, shift the range of wake performance that is available. Changes to "variable" masses, such as ballast system(s) 120 and the effects of control surface(s) 170, move the present performance level (and thus Current Performance Indicator 310) between the minimum available potential (indicated by Lowest Available Potential Indicator 410) and the maximum available potential (indicated by Highest Available Potential Indicator 230).

The nomenclature of "fixed" and "variable" masses is used herein solely to reflect their relative variability. Masses such as the number and constituency of passengers, the amount of fuel, etc. can be changed but are not as easily varied as other masses such as ballast amounts and control surfaces. Herein, "fixed" comprises less conveniently variable masses while "variable" comprises more easily altered masses (or easily altered characteristics which modify the effective mass of the wakeboat, such as control surfaces 170).

In some embodiments, controller 100 distinguishes changes to the different types of mass based on which sensor(s) were, or were not, affected. Continuing with the above examples, the addition of fuel would affect fuel fluid level sensor 195 but not sensors in ballast system(s) 120. In contrast, changes in ballast system(s) 120 would not affect fuel fluid level sensor 195. Change to passenger or equipment load would affect mass sensor(s) 180 and/or hull sensors 110 but not fuel fluid level sensor 195 nor sensors in ballast system(s) 120.

Certain embodiments of the present disclosure thus quickly and clearly inform the operator of the performance characteristics of the wakeboat. With a glance, the operator can see 1) the wakeboat's complete range of performance; 2) the performance range available at this time; 3) the present performance level; and 4) what performance adjustments are possible given the present performance level and the boundaries established by the highest and lowest available performance indicators.

Figure 6:
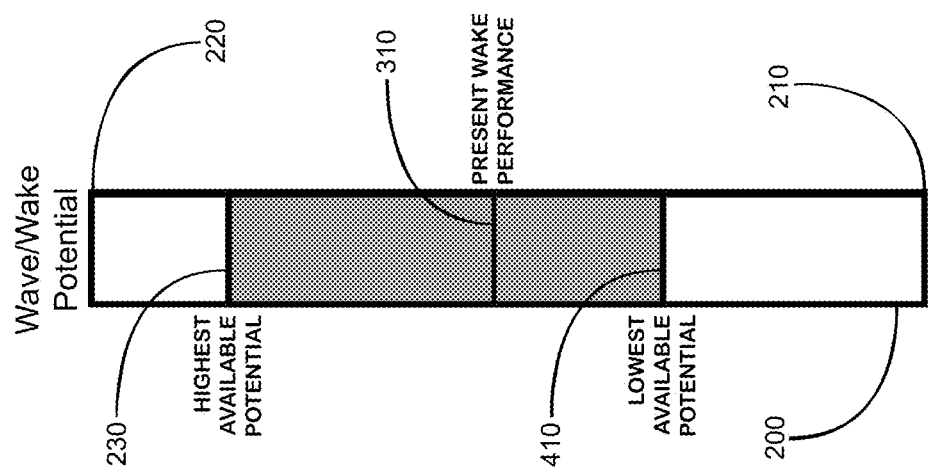
FIG. 6 illustrates yet another display of wakeboat operational characteristics according to some embodiments of the disclosure.

The graphical techniques shown in FIGS. 3, 4, and 5 are not the only graphical techniques by which various embodiments of the present disclosure can illustrate information. FIG. 6 shows another approach employed by some embodiments, using superimposed bargraphs.

In FIG. 6, the overall performance range delineated by minimum performance indicator 210 and maximum performance indicator 220 is shown as a bargraph. Superimposed is an available performance bargraph, delineated by Highest Available Potential Indicator 230 and Lowest Available Potential Indicator 410. Superimposed over both is a line representing Current Performance Indicator 310.

In operation, the available performance bargraph can lengthen and shorten, and move up and down, with respect to the overall performance bargraph. Likewise, Current Performance Indicator 310 can move within the present boundaries of the available performance bargraph.

The result is a concise representation of data, requiring just a quick glance by the operator to fully understand the present operating conditions of the wakeboat.

Other graphical representations are, of course, possible and various embodiments of the present disclosure can make them available as desired by the manufacturer and/or the operator. While FIGS. 3-6 show information in linear layouts, the same information can be conveyed in other manners.

Figure 7:
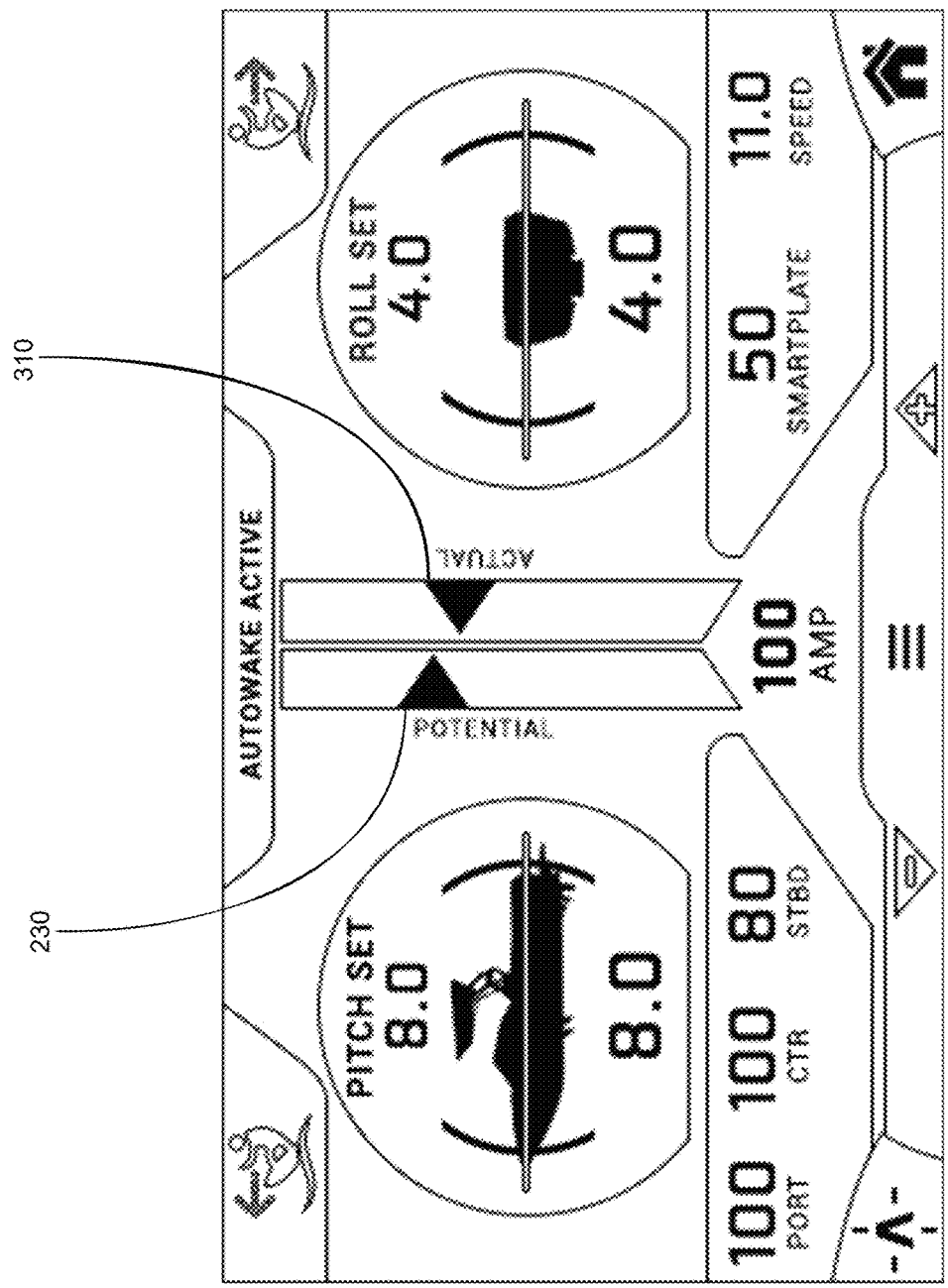
FIG. 7 illustrates wakeboat displays and controls according to some embodiments.

FIG. 7 illustrates one example of wakeboat operator input and output systems including displays of potential and actual performance. The display of FIG. 7 is a touchscreen, in some embodiments, and includes indication (output) and control (input) of parameters such as hull pitch angle, hull roll angle, control surface settings, vessel velocity, and so forth. The center of this display includes Highest Available Potential Indicator 230 (labeled "POTENTIAL") and Current Performance Indicator 310 (labeled "ACTUAL"). In some embodiments, operator adjustment of the present performance level can be effected via touching and dragging Current Performance Indicator 310 to the desired level. In other embodiments, the present performance level can be modified using the "+" and "−" arrows at the bottom of the touchscreen display. Some embodiments of the present disclosure enable the use of multiple operator input techniques so any combination of the above, or additional, approaches may be supported.

Figure 8:
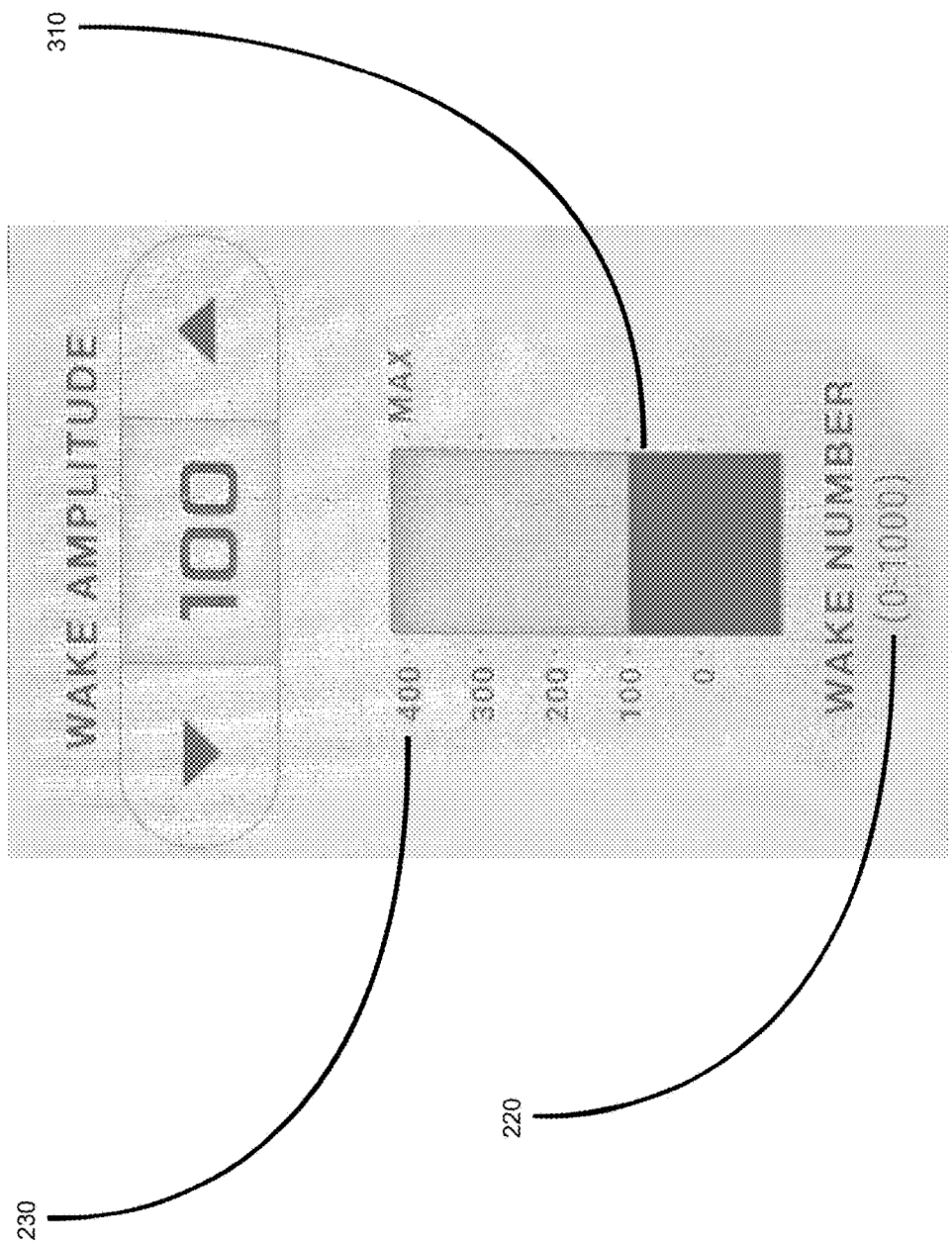
FIG. 8 illustrates wakeboat displays and control according to some embodiments.

FIG. 8 illustrates another example of a wakeboat operator input and output system including displays of potential and actual performance. This display includes Maximum Potential 220 (labeled "MAX") with a range of up to 1000. Highest Available Potential Indicator 230 is shown as having a present value of 400; in this embodiment the scale of numbers on the left of the bargraph changes, within the limit set by Maximum Potential 220, as the highest and lowest available potential varies. Current Performance Indicator 310 reflects a present performance level of 100; this value is also shown digitally at the top of the display together with the label "Wake Amplitude" to help some operators better understand the information being conveyed. In some embodiments, the up and down arrows (in this example at the top of the display) can be activated by the operator to increase or decrease the present performance level, which would then be indicated by a corresponding change in Current Performance Indicator 310 (and the digital representation).

FIG. 7 and FIG. 8 are just two examples of how some embodiments of the present disclosure can communicate information to an operator and accept input from an operator. FIG. 7 and FIG. 8 are not meant to be limiting or restrictive; a wide variety of input and output techniques are employed by various embodiments as suitable for the needs of each particular application.

Warning thresholds are included in some embodiments of the present disclosure. For example, if the mass of the wakeboat reaches certain levels, controller 100 can alert the operator. Some embodiments allow, or even require, acknowledgement of such warnings by the operator to ensure notification has occurred.

Some embodiments notify the operator of environmental conditions that affect the wake performance of the wakeboat. As just one example, water below the hull being too shallow can adversely affect the wake size that can be obtained irrespective of the mass of the wakeboat itself. In some embodiments, controller 100 can detect shallow water using a water depth hull sensor 110 and selectively notify the operator that performance will be affected until the wakeboat is moved to deeper water. Some embodiments may also adjust the various indicators herein described to reflect the impact of the shallow water upon the available and/or present performance of the wakeboat.

Different embodiments of the present disclosure can opt to use different names, or labels, for the elements of graph 200. Some embodiments omit alphanumeric "names" and use symbols instead. Some embodiments allow different languages or other symbology options, selected by the manufacturer and/or the operator. A variety of labeling choices are possible depending upon the specific application.

Various embodiments of the present disclosure can communicate wakeboat performance information in a variety of ways. As just some examples, the information can be communicated via numeric displays representing percentages, pounds/kilograms or other units of measure, draft distances, or any other values suitable to the application. The information can be communicated via arrays of discrete indicators. Some embodiments use polychromatic indicators whose changing colors convey the data, or acoustic or tactile indications so the eyes of the operator need not be distracted.

Some embodiments incorporate the display of this information into other instruments or displays aboard the wakeboat, such as fixed or handheld screens or gauges that are also used for other purposes. Some embodiments also support the wireless transmission and/or reception of such information, as noted earlier herein.

Some embodiments take advantage of the measurement of wakeboat mass and apply it advantageously to various aspects of wakeboat operation. As just one example of the many ways this capability can be employed, the operation of control surface(s) 170 can be optimized based on the value represented by Current Performance Indicator 310 (which represents present wakeboat mass). Control surfaces are often used to assist an accelerating hull to transition from displacement mode to planing mode (often referred to as "getting on plane" or "planing out"). This transition is greatly affected by the wakeboat's mass; a more massive condition may require more extensive reposition of control surface(s) 170. In contrast, a more lightly loaded hull may require less assistance thus minimizing the time necessary for the temporary repositioning of control surface(s) 170.

Some embodiments of the present disclosure incorporate additional criteria about the wakeboat. For example, engine power may be incorporated into the display. There is a wide range of engine options available to wakeboat manufacturers and, thus, to their customers. While more powerful engines are generally more expensive, that additional power may also make it possible to operate the wakeboat with larger amounts of ballast. A given wakeboat hull may have a different maximum amount of acceptable ballast, and display its Highest Available Potential Indicator 230 differently, based upon the engine installed in a particular hull.

If a larger engine is installed in a particular hull, the manufacturer may also opt to increase the size of the ballast compartments (since the larger engine's increased power enables that particular wakeboat to handle the increased wakeboat mass). The result is a wakeboat with greater potential performance, due to the overall increase in mass, which is in turn enabled by the greater power available from the larger engine. Some embodiments of the present disclosure adjust the display of the Highest Available Potential Indicator 230 to reflect the increase in engine power and/or ballast compartment capacity.

Some embodiments of the present disclosure support the ability to adjust parameters, such as engine power and ballast compartment capacity, both at time of manufacture and at later times. For example, when a wakeboat's engine is replaced, sometimes a larger engine is installed in its place. Suitable embodiments of the present disclosure allow for information regarding the engine to be updated so controller 100 can incorporate such changes into its operation and the information that is displayed to the operator of the wakeboat.

This ability to accommodate post-manufacturing updates is not limited to engine power. It is common for wakeboat owners to increase ballast capacity by installing additional ballast compartments, or by installing larger ballast compartments in place of the original ballast compartments. Some embodiments of the present disclosure allow controller 100 to be informed of such changes, again so controller 100 can incorporate them into its operation and the information that is displayed to the operator of the wakeboat.

Some embodiments may alert the wakeboat operator to optional improvements based upon criteria such as engine power and ballast capacity. For example, if the installed engine can successfully operate the hull with more mass than the installed ballast compartments can accommodate, controller 100 may selectively inform the wakeboat operator of the advantages of upgrading the ballast capacity. This feature of some embodiments can be an advantage for both the operator (who may obtain greater performance from his wakeboat) and the manufacturer (who may enjoy additional revenue resulting from such an upgrade).

Some embodiments may alert the wakeboat operator to potential limitations of the wakeboat's present configuration. As noted earlier, excessive mass can pose outright safety hazards; but there may be amounts of mass that, while within the safety envelope of the hull in question, are still too much for the installed engine to properly accommodate.

Some embodiments may thus adjust their Highest Available Potential Indicator 230 to reflect the maximum amount of ballast supported by the presently installed engine. Some embodiments may also selectively alert the operator to this adjustment, so the operator knows that it is the engine that is limiting the operational mass.

Since engine size, ballast capacity, and other criteria are so central to the performance of a wakeboat, some embodiments of the present invention include a selection feature that allows possible buyers the ability to select various options and have controller 100 display their effects on the potential of a wakeboat so configured. Wakeboats are an expensive purchase, and thus it is common to evaluate them with an on-water demonstration, generally accompanied by a representative of a wakeboat dealer. The representative can assist a possible buyer by selecting combinations of options, with controller 100 adjusting the Highest Available Potential Indicator 230 as various options are selected, deselected, and combined.

This feature of some embodiments can be a powerful sales tool. It can be financially impractical for a wakeboat dealer to have demonstration wakeboats on hand with every possible configuration of options. But after spending a short time in a single demonstration wakeboat, and becoming familiar with its performance as indicated by Highest Available Potential Indicator 230, a possible buyer can then visualize the changes in performance that would result with the addition or deletion of various options.

For example, having become familiar with the performance of a demonstration wakeboat, a possible buyer could be shown the increase in performance that would be available with a configuration incorporating an engine upgrade. Conversely, a more budget minded buyer could be shown the performance reduction that would result from dropping to a less expensive, less powerful engine.

Extending the earlier ballast capacity examples, a budget minded buyer could also be shown the performance that would be available with a smaller, "starter" ballast package that would reduce their initial purchase price—but also be shown the future performance of that same wakeboat with a ballast upgrade that could be added later when the buyer's finances make that possible. Some marine engines offer a performance package that can be retrofitted to existing engines, and this too can be viewed and considered by possible buyers as part of their purchase decision. Such "future proofing" of so large an investment can be a significant enticement to favor one brand of wakeboat over others, and engender goodwill and positive public relations for the manufacturer.

The aforementioned features of some embodiments can help a possible buyer to make an informed choice. Likewise, the dealer and manufacturer can increase sales of options and upgrades at the time of initial sale and/or afterward. The mental awareness that their wakeboat still has untapped potential, as selectively displayed by the some embodiments of the present disclosure during demonstrations and/or during normal operation after purchase, encourages brand loyalty and repeat purchases on the part of the wakeboat owner and operator.

In some embodiments, the ability to measure and display mass related parameters may be enhanced by providing recommendations of changes to the distribution of mass. Stated another way, the total amount of wakeboat mass may not be the only parameter which affects wake performance—in some embodiments the distribution of portions of that mass in different locations around the hull may also change wake performance.

To understand the effect of mass distribution an extreme example can be used. A wakeboat at rest in the water with its mass evenly distributed will have a certain degree of displacement which in turn will yield a certain hull draft and define a waterline along the outside of the hull. The wakeboat would float a certain way, drive a certain way, and generate a certain wake during forward motion in the water.

If 80% of the wakeboat mass were instead concentrated to the left/port side of the hull, many things would change dramatically. The hull would float with a tilt toward its left/port side, the right/starboard side would be raised, and the waterline along the outside of the hull would be at an angle relative to the transom. The wakeboat would float a very different way, drive a very different way, and generate a very different wake during forward motion in the water. This, despite the total mass of the wakeboat being unchanged from the "evenly distributed" example first cited above.

From the above discussion it is clear that the distribution of mass aboard a wakeboat may need to be considered when measuring, (re) establishing, and displaying its wake performance level.

Hull sensors 110 of FIG. 2 are not limited to measuring the gross mass of the wakeboat. In some embodiments hull sensors 110 may comprise one or more accelerometers, inclinometers, and/or gyroscopes to measure the amount, rate, and/or rate of change of hull translation and/or rotation on one or more axes. Other sensor types may also be used in some embodiments according to the specifics of the application.

By combining the data obtained from such sensors, some embodiments may determine not just the total mass, but the distribution of that mass aboard the wakeboat. Some embodiments may then report this information via a display, computer interface, or other communication device.

Some embodiments may selectively calculate changes which would yield improvements in the wake performance of the wakeboat. These potential changes may be recommended via a display, computer interface, or other communication device. Wakeboat operator(s) or passenger(s) may then selectively act upon such recommendations to change and/or improve the wake performance.

Some embodiments may selectively allow the calculated changes to be implemented automatically for the convenience of wakeboat operator(s) or passenger(s). Ballast System(s) 120, Actuator(s) 130, Control Surface(s) 170, Engine 14, and other components and subsystems of the wakeboat may be selectively manipulated by Controller 100 to realize the calculated changes and pursue the projected wake performance.

In some embodiments, one or more wake performance criteria may be stored in Configuration Memory 105. When selectively retrieved, such wake performance criteria may form the target(s) for the calculated changes mentioned above. In some embodiments Controller 100 may be given control of various components and subsystems of the wakeboat as described above, thus yielding an autonomous wake performance system.

Boat 10 in FIG. 1 supports a display device that, in some embodiments, comprises operator inputs 150 and operator outputs 140. The display device may selectively display a screen, tab, and/or page 910 including a graphical illustration of hull 920 of wakeboat 10 as viewed from above. Attention is directed to U.S. patent application Ser. No. 17/735,049 to Hartman, filed 2 May 2022 and incorporated herein by reference, which discusses display devices including but not limited to tablet computers that could comprise screen 910 in some embodiments.

Figure 9:
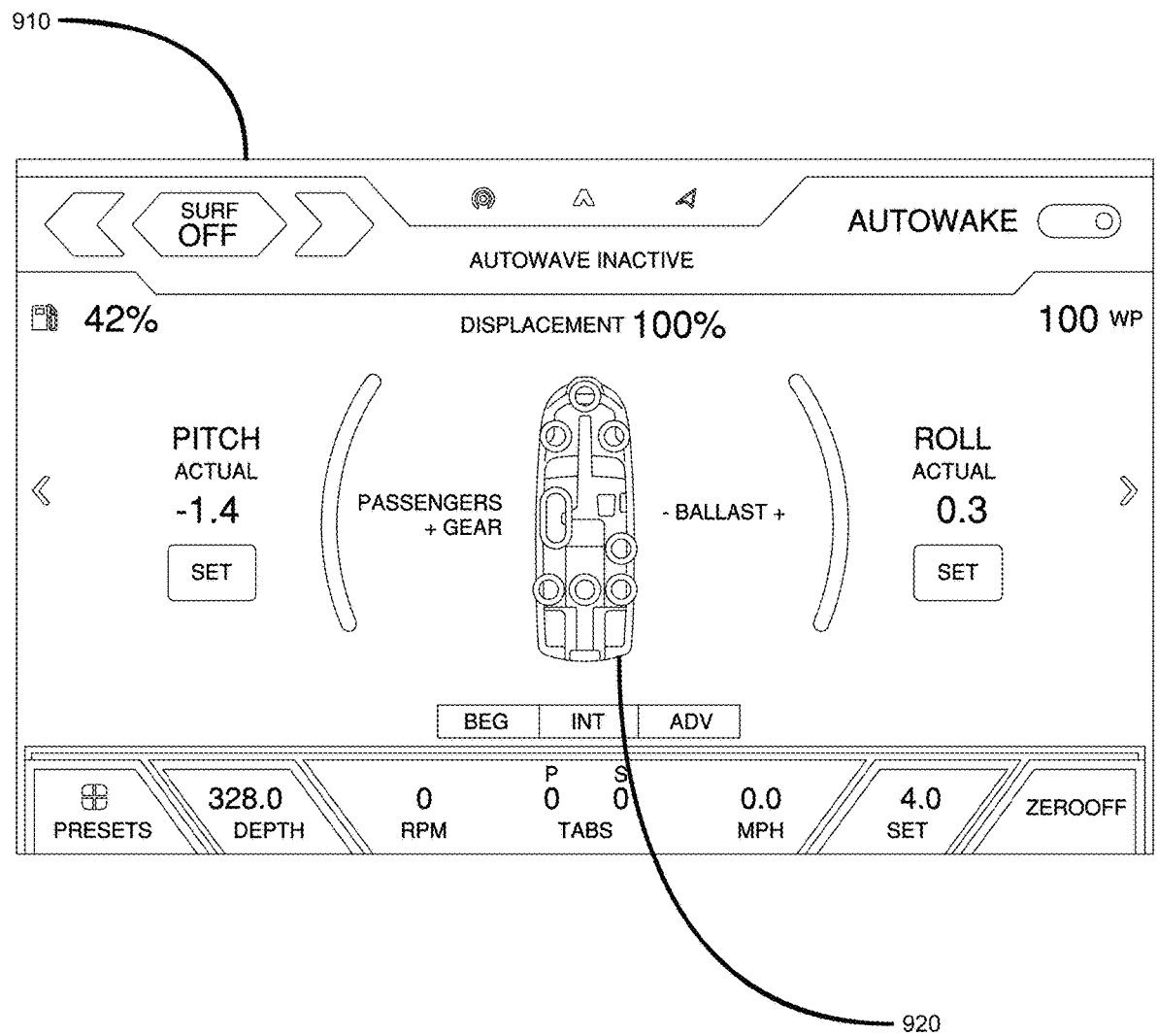
FIG. 9 illustrates wakeboat displays and controls according to some embodiments.

In some embodiments such as that shown in FIG. 9, screen, tab, and/or page 910 may include a variety of operator inputs 150 and operator outputs 140 in addition to those described in detail herein. Examples are shown in screen, tab, and/or page 910 to illustrate that such inputs and outputs may be included, but will not be further described since they are not directly relevant to the discussion herein.

Figure 10:
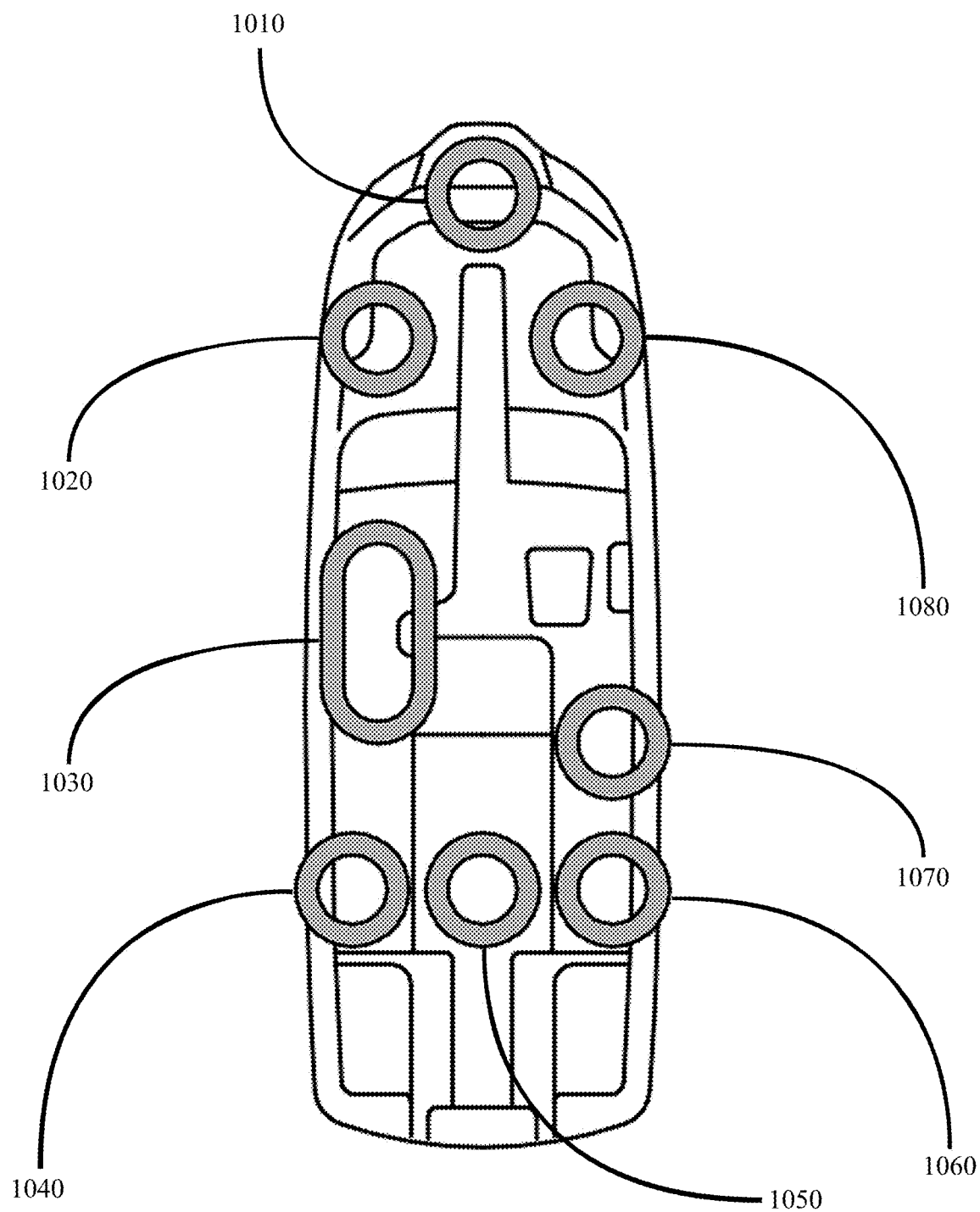
FIG. 10 is a close up of a portion of the display and controls of FIG. 9 according to some embodiments.

FIG. 10 provides a closeup of hull image 920. Icons 1010, 1020, 1030, 1040, 1050, 1060, 1070, and 1080 identify zones within the hull, and in FIG. 10 said zones have been highlighted for purposes of discussion. In some embodiments the icons may be used to communicate mass distribution within the zone represented by each icon. In some embodiments the icons may be used to indicate recommended mass distribution changes (e.g. addition or subtraction of mass) within the zone represented by each icon.

As passengers and equipment may represent a meaningful percentage of total mass, in some embodiments mass measurement may comprise hull sensors 110 in one of more zones to obtain measurements of the objects—and thus the mass—in said zones. Such zone sensors may include but are not limited to pressure sensors; optical imaging sensors; proximity sensors using ultrasonic, thermal, capacitive, or other characteristics; and/or other sensor types suited to the specifics of the application.

The addition or subtraction of mass in the zone represented by an icon may be accomplished by any of several techniques, including but not limited to one or more of movement of passengers between icon zones, changes to hull-integrated ballast compartments in the icon zones, and/or movement of material such as portable ballast compartments or other equipment between icon zones.

For ease of the following discussion, hull orientation while floating in water will herein be referenced via the three standard orthogonal axes shown in FIG. 1 and commonly referred to as X/lateral/pitch 15, Y/longitudinal/roll 16, and Z/vertical/yaw 17. The X/lateral/pitch axis 15 runs left-to-right across the width of the hull; the Y/longitudinal/roll axis 16 runs front-to-back along the length of the hull; and the Z/vertical/yaw axis 17 runs vertically up-and-down from above to below the hull.

It can be seen from FIG. 10 that the zones defined by the icons do not always have an effect solely on a single axis. Some, such as front/bow zone 1010 and rear/stern center zone 1050, may be centered on one axis (in these examples, Y/longitudinal/roll axis 16) and thus changes in mass in these zones would primarily affect the rotation of the hull around orthogonal X/lateral/pitch axis 15 while floating in water. Likewise, zone 1030, if centered on X/lateral/pitch axis 15, may primarily affect rotation around orthogonal Y/longitudinal/roll axis 16.

In contrast, zone 1020 is offset toward the front/bow and to the left/port of the hull, not centered on any axes. Mass added or removed from zone 1020 may thus affect X/lateral/pitch axis 15 and the Y/longitudinal/roll axis 16—and the effect on one axis may not be the same as the effect on another.

It is also apparent that many factors influence how mass in a given zone will affect the hull. Such factors include but are not limited to hull shape, speed in the water, present settings of control surfaces and actuators, etc. In short it is unlikely that a "one solution fits all" approach can be achieved for different boat models, lengths, configurations, and operational conditions.

To address this, some embodiments include both calculated and measured/empirical data to derive weighting factors for each zone. Such weighting factors may then be used to estimate the effect of adding or removing mass from a zone.

Such combined calculated and measured/empirical data may yield a table such as that shown in FIG. 11, whose zone numbers and locations refer to those shown in the example boat layout of FIG. 9 and FIG. 10. The choices of data representation are many, varied, and specific to the application. For instance, the mass relationships may be shown as percentages of 100 distributed across three axes; such ratios may then be used to scale additions or removals of zonal masses to determine the net effect.

In this example, the data is shown as the effect of adding mass to specific zones. The choice of this representation is meant to be illustrative and not exclusive; the specifics of a given embodiment may involve a different quantity of zones, different zone locations, different data representation, and other variables.

For the following discussion FIG. 10 and FIG. 11 will be used together to relate the locations shown in FIG. 10 to the numeric data shown in FIG. 11.

In this example Zone 1010 is on the very front/bow of the hull. Adding mass to Zone 1010 causes rotation around X/Lateral/Pitch axis 15 (the front/bow of the hull "pitches forward") and the table indicates the magnitude of the rotation to be +0.9 degree as a result of adding 50 kilograms of mass. Zone 1010 is centered on Y/Longitudinal/Roll axis 16 and thus causes negligible (0 degree) rotation. Zone 1010 is also not located on the plane of rotation for Z/Vertical/Yaw axis 17 so it imparts no rotation there. As a result, the table shows that the addition of 50 Kg to Zone 1010 yields a positive rotation on X/Lateral/Pitch axis 15 and no change on the other two axes.

In this example, Zone 1030 is another whose effects are primarily on a single axis by virtue of its location in the hull. Zone 1030 is relatively centered front-to-back, but highly offset left-to-right, such that changes in mass affect rotation around Y/Longitudinal/Roll axis 16. In this example "positive" rotation is interpreted to mean the left/port side is lowering and the right/starboard side is rising, so the addition of mass in Zone 1030—on the left/port side of the hull-yields a positive value.

This example now considers the more complex Zone 1060, which is offset from the centerlines of all three axes. For a given mass change, its effect will thus be distributed across X/Lateral/Pitch axis 15 and Y/Longitudinal/Roll axis 16. Note that, as Zone 1060 is on the opposite "ends" of both axes from the analyses of Zone 1010 and Zone 1030 above, the effect is inverted on both axes.

Zone 1060 illustrates why mass distribution matters in a wakeboat: Changes of mass within a single zone can affect more than one axis. It should be noted that the rotational magnitudes do not necessarily sum algebraically for reasons including but not limited to hull design and the varying depths of the wetted surface of the hull (for example, deeper hull surface areas experience greater buoyancy than those nearer the waterline).

One more sample zone will be analyzed: Zone 1020. Being in the "opposite corner", the polarities of its effects on each axis are reversed relative to Zone 1060. But the absolute magnitudes may differ, as shown in this example, due to the specifics of the application.

The completed table in FIG. 11 represents the effects of mass changes in the various zones. In some embodiments, this information may be used to predict the change in rotation resulting from a proposed change in mass. In some embodiments, this information may be used "in reverse" to predict the change of mass necessary to obtain a desired change in rotation.

Figure 12:
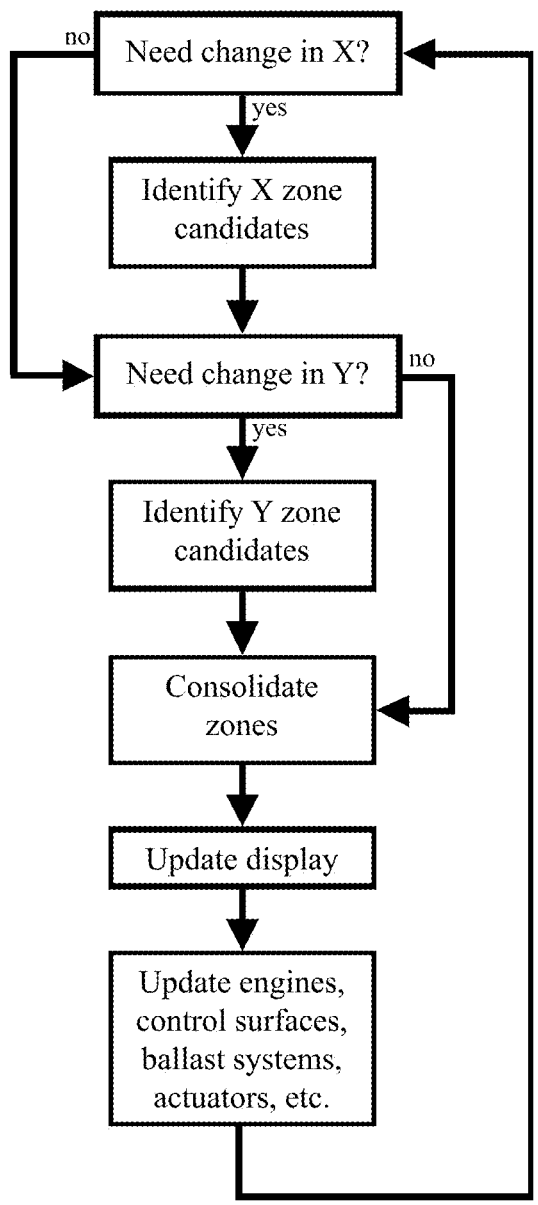
FIG. 12 is a flowchart of logic implemented by a controller of the wakeboat management system of FIG. 2 to control the display of FIG. 9 according to some embodiments.

FIG. 12 shows a control loop which, in some embodiments, may be executed by controller 100. Beginning at the top of the flowchart, X/Lateral/Pitch axis 15 measurement from hull sensor(s) 110 is compared with a target value. If no X axis change is required, the next step is omitted as shown. If a change is required, the nature of the change is considered against the effects of mass addition/removal from the various zones of the specific wakeboat in question and possible X-affecting zone candidates are identified.

Next Y/Longitudinal/Roll axis 16 measurement from hull sensor(s) 110 is compared with a target value. If no Y axis change is required, the next step is omitted as shown. If a change is required, the nature of the change is considered against the effects of mass addition/removal from the various zones of the specific wakeboat in question and possible Y-affecting zone candidates are identified.

In the next step, the lists of zone candidates are potentially consolidated. Many scenarios are possible here. As one example, if the X axis needs negative rotation and the Y axis needs positive rotation, adding mass to Zone 1040 alone will accomplish both objectives so only a single zone may need to be affected.

As another example, if the X axis needs no change but the Y axis needs negative rotation, there is no single zone with those characteristics. The closest match is Zone 1070, but adding mass there may also cause undesired negative rotation to the X axis as shown in the table of FIG. 11. To offset this latter effect, Zone 1010 could receive a relatively smaller amount of additional mass so its positive X effect may offset the undesired negative X effect of Zone 1070.

As yet another example, if the Y axis needs no change but the X axis needs negative rotation, Zone 1050 matches those requirements.

It should be noted that polarity inversion for the rotation value(s) shown in FIG. 11 may be obtained via the removal of mass from the associated zone(s). Controller 100 may select that option during zone consolidation for various reasons including, but not limited to, Watercraft Mass Sensor(s) 180 indicating that the total mass of the wakeboat is at or above a target value.

Upon completion of zone consolidation, controller 100 may indicate the selected zone(s) via operator output(s) 140 including but not limited to a graphic display such as that illustrated in FIG. 10. In some embodiments the icon(s) associated with the selected zone(s) may be visually modified to convey the recommended changes. Such modifications may include but are not limited to changes in size, color, shape, and orientation.

As one example, the circular icons shown in FIG. 10 may be shown in green when no changes are required, red when a mass reduction is recommended, and blue when a mass increase is recommended. For another example, the circular icons could be removed when no changes are required, made solidly visible for a mass reduction, and displayed flashing for a mass increase. In some embodiments multiple changes to an icon's appearance may be combined to convey more information in the same space, helpfully reducing clutter on the display.

Upon completion of display updating, controller 100 may selectively take autonomous action upon the various subsystems on the wakeboat to pursue the recommended changes (if such autonomous action is enabled). Such subsystems may include but are not limited to engine(s), control surface(s), ballast system(s), and/or actuator(s). The modifications to the displayed icons mentioned above may include indication of such autonomous action in some embodiments.

In some embodiments examples of autonomous actions include but are not limited to changing engine RPM, (re)positioning control surfaces, adding and/or removing ballast from ballast compartment(s), and/or adjusting actuators.

Upon completion of any autonomous actions, controller 100 may loop back to the top of the sequence shown in FIG. 12. Thus controller 100 in some embodiments monitors the conditions of the various axes of the hull, chooses corrective actions, recommends them via operator output(s) 140, and selectively takes autonomous action to achieve them, in a generally continuous manner. Controller 100 may integrate this functionality with other tasks and responsibilities based on the specifics of each implementation.

Embodiments which follow the above example may seek to achieve and maintain a specific hull orientation in the surrounding water. By recommending and/or effecting changes, the above example trends toward rearranging the distribution of the existing mass aboard the wakeboat. Some embodiments may aid the wakeboat operator to achieve a specific amount (e.g. an increase or decrease) of total wakeboat mass, instead of or in addition to achieving and maintaining specific hull orientations in the surrounding water.

In one example above the Y axis needed no change but the X axis needed negative rotation, and adding mass to Zone 1050 satisfied those requirements (by sinking the stern and raising the bow, thus causing negative rotation around the X axis). Adding mass to Zone 1050 also happens to increase the total mass of the wakeboat, which may be desirable in terms of increasing wake performance.

In contrast, if it is desirable to decrease the wake performance by reducing the total mass, negative rotation around the X axis may also be achieved in some embodiments by reducing (in this example) the mass in Zone 1010 instead of increasing the mass in Zone 1050. Negative rotation around the X axis is still achieved, but via an overall reduction in wakeboat mass (by removing mass from Zone 1010) instead of an overall increase in wakeboat mass (by adding mass to Zone 1050).

Some embodiments thus allow the operator of the wakeboat to pursue multiple mass-related goals simultaneously: Achieving and/or maintaining hull orientations in the surrounding water, while selectively increasing or decreasing the total mass aboard the wakeboat. Some embodiments thus assist the operator in achieving and/or maintaining desired levels of wake performance, efficiency, and other operational goals while compensating for day-to-day, or even moment-to-moment, changes in parameters including but not limited to passenger count and location, equipment, and fuel load.

The above examples have referred to accelerometers and/or inclinometers 110 in determining hull orientation in the surrounding water. Some embodiments use other sensors to obtain hull orientation data-sometimes in conjunction with additional parameters.

The draft, or depth in the surrounding water, of the hull is an indication of total mass aboard the wakeboat. Some embodiments use draft sensor(s) 110 together with, or in substitution for, watercraft mass sensor(s) 180 to derive the mass aboard the wakeboat. Some embodiments use multiple draft sensors 110, for example at the front, rear, left side, and right side of the hull, to obtain not only a measure of the draft (and therefore mass) but also the orientation of the hull in the surrounding water.

Figure 13:
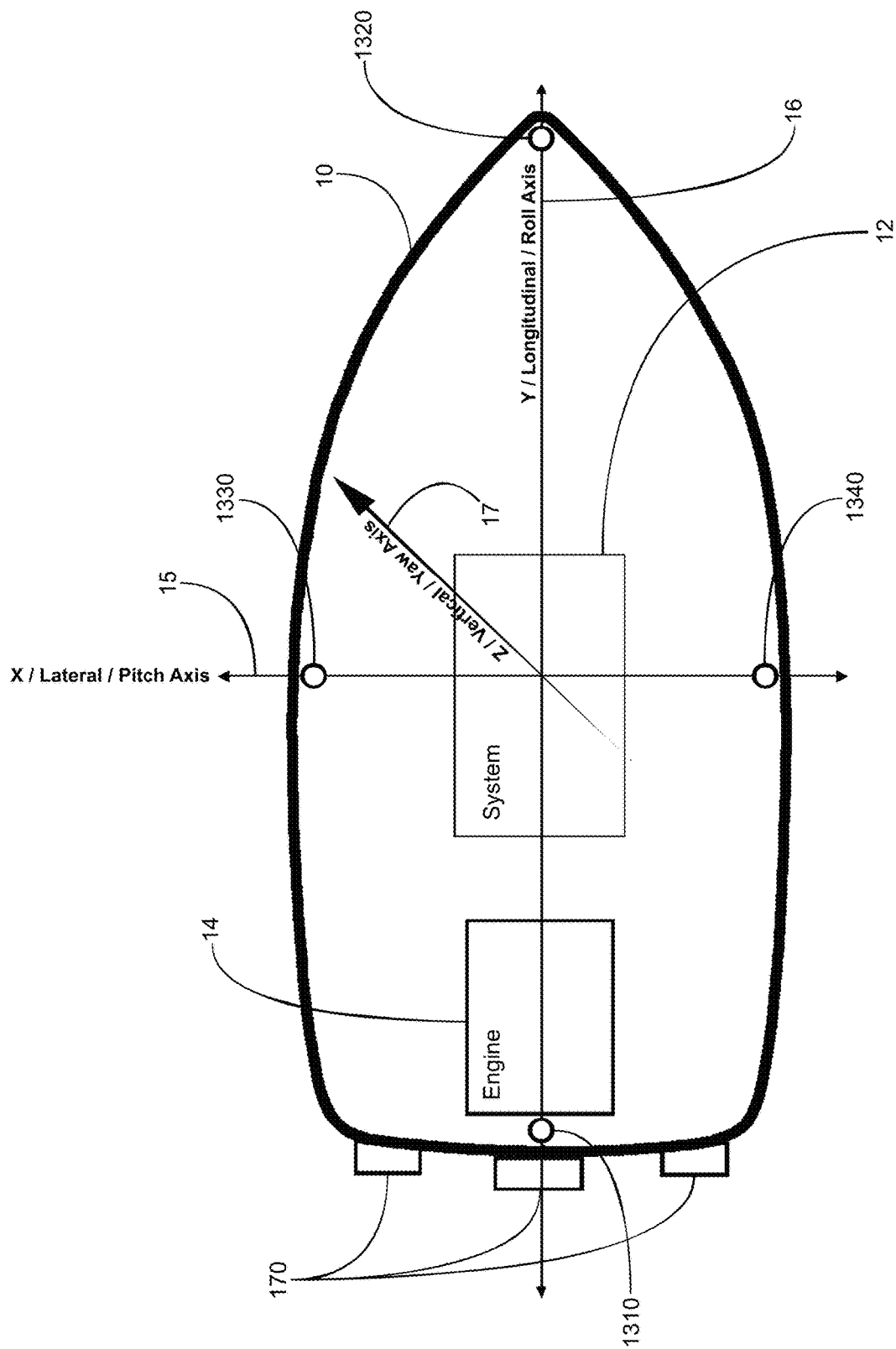
FIG. 13 illustrates a wakeboat including draft sensor according to some embodiments.

Referring to FIG. 13, some embodiments equip the hull with a rear/stern draft sensor 1310, a front/bow draft sensor 1320, a left/port draft sensor 1330, and a right/starboard draft sensor 1340. In some embodiments, if the left/port side of the hull is lower in the water than the right/starboard side, draft sensor 1330 will measure deeper draft than draft sensor 1340. Likewise, if the rear/stern of the hull is lower in the water than the front/bow of the hull, draft sensor 1310 will measure deeper draft than draft sensor 1320.

As a more complex example, additional mass in Zone 1040 would cause further lowering of the left and rear portions of the hull (and further raising of the opposite sides), with corresponding changes in the measurements from the associated draft sensors.

Some hulls may suffice to use a single draft sensor for certain axes. For example, draft sensor 1310 mounted at the rear/stern of the hull may be sufficient to interpolate the draft of the front/bow of the hull. Likewise, draft sensor 1330 mounted to one side of the hull may be sufficient to interpolate the draft of the other side of the hull. Embodiments which incorporate this technique may be able to reduce the total number, and expense, of draft and other hull sensors 110 and watercraft mass sensor(s) 180 if the specifics of the hull make possible such interpolation.

These relationships may be specific to each hull design due to total surface area, deadrise angle, and other attributes. They can be empirically characterized and used in some embodiments to obtain hull orientation, mass distribution, and total mass values. This is just one example of how various embodiments may use different types (or combinations) of hull sensor(s) 110 and/or watercraft mass sensor(s) 180 depending upon the specifics of each application.

Some embodiments also assist the operator with management of the Z/vertical/yaw axis of the hull. Hull yaw can have a meaningful effect on the wake performance of a wakeboat for many reasons including but not limited to the effect of the side of the hull on the resulting wake. A generally symmetrical hull relationship to its direction of motion through the water contributes a generally symmetrical effect to the wake behind the hull. In contrast, imparting yaw to the hull creates an asymmetrical hull relationship to the direction of motion through the water, sometimes called "crabbing" due to the appearance of (at least partial) sidewise motion. The water thus "sees" an asymmetrical effect from the hull, and the wake behind the hull is affected asymmetrically.

This yaw effect may be used in some embodiments to augment and/or enhance control of the wake performance. Many factors may influence hull yaw, including but not limited to mass distribution within the wakeboat, actuator(s) 130, and control surface(s) 170. Indeed, these multiple factors may interact in their net effect on hull yaw in ways which may not be immediately apparent to the operator of a wakeboat. In some embodiments controller 100 may receive yaw measurement data from hull sensor(s) 110 and incorporate target yaw value(s) in the recommendations presented to the operator.

As one example, if a control surface 170 is mounted on the left/port side of the hull and extended downward into the water passing under the hull, it will create asymmetric drag which will tend to rotate the hull counterclockwise as viewed from above in FIG. 1. Using traditional coordinate systems this would be reported by a yaw sensor 110 as positive rotation around the Z/vertical/yaw axis.

Next, consider the effect of additional mass in zones 1020, 1030, and/or 1040 of FIG. 10, all of which are on the left/port side of the hull. Increased mass on the left side will lower the left side, which will drive the left-mounted control surface 170 deeper in the water, which will increase its effective drag, which will increase the positive rotation around the Z/vertical/yaw axis. The same effect may be obtained by reducing the mass in zones 1060, 1070, and/or 1080; in both cases the left/port side goes "deeper" while the right/starboard side goes "shallower".

Conversely, a reduction in positive rotation around the Z/vertical/yaw axis may be obtained by decreasing the mass on the left/port side (zones 1020, 1030, and/or 1040) and/or increasing the mass on the right/starboard side (zones 1060, 1070, and/or 1080) due to the reduced effect of the left-mounted control surface 170.

The above example illustrates how yaw may be affected by controllable parameters, and how yaw may be measured by hull sensor(s) 110. The Z/vertical/yaw axis is another axis like the X/lateral/pitch axis and the Y/longitudinal/roll axis. In some embodiments controller 100 may receive sensor data for the former axis just as it does the latter two axes, and incorporate Z/vertical/yaw considerations in the recommendations presented to the operator and/or realized by autonomous actions.

In compliance with the patent statutes, the subject matter disclosed herein has been described in language more or less specific as to structural and methodical features. However, the scope of protection sought is to be limited only by the following claims, given their broadest possible interpretations. Such claims are not to be limited by the specific features shown and described above, as the description above only discloses example embodiments.

We claim:

1. A wakeboat that during operation creates a wake, the performance level of the wake varying depending upon the distribution of mass of and aboard the wakeboat, the wakeboat comprising:
   a hull;
   processing circuitry supported by the hull;
   a sensor configured to measure at least one parameter of the wakeboat, the sensor providing data to the processing circuitry, the processing circuitry configured to use the sensor data to derive the distribution of mass, the processing circuitry configured to use the distribution of mass to determine changes to the mass distribution which would yield a different wake performance level; and
   a display coupled to the processing circuitry, the processing circuitry being configured to use the display to indicate changes to the mass distribution which would yield the different wake performance level.

2. The wakeboat of claim 1 wherein the sensor comprises measuring the rotation of the hull around at least one axis, the processing circuitry deriving the distribution of mass using data comprising the measurement of hull rotation.

3. The wakeboat of claim 1 wherein the sensor comprises measuring the depth of the hull in the surrounding water, the processing circuitry deriving the distribution of mass using data comprising the measurement of hull draft.

4. The wakeboat of claim 1 wherein the sensor measures the distribution of mass via at least one of pressure, optical, thermal, ultrasonic, and capacitance.

5. The wakeboat of claim 1 further comprising at least one passenger aboard the wakeboat, wherein the indicated changes to the mass distribution comprise repositioning at least one passenger aboard the wakeboat.

6. The wakeboat of claim 1 further comprising at least one ballast compartment supported by the hull, wherein the indicated changes to the mass distribution comprise at least one of adding and removing ballast from the ballast compartment.

7. The wakeboat of claim 6 wherein the processing circuitry is further configured to selectively change the mass distribution by at least one of automatically adding or automatically removing ballast from the ballast compartment.

8. The wakeboat of claim 1 further comprising at least one ballast compartment supported by the hull, wherein the indicated changes to the mass distribution comprise relocating the ballast compartment.

9. The wakeboat of claim 1 further comprising a hydrodynamic control surface supported by the hull, the hydrodynamic control surface selectively changing the effect of the mass of the wakeboat on the wake performance level while the hull is in motion in water, the processing circuitry incorporating the effect of the hydrodynamic control surface in the indicated changes to the mass distribution.

10. A wakeboat that during operation creates a wake, the performance level of the wake varying depending upon the distribution of the mass of and aboard the wakeboat, the wakeboat comprising:
    a hull;
    processing circuitry supported by the hull;
    a plurality of draft sensors configured to sense orientation of the hull of the wakeboat, the sensors providing data to the processing circuitry, the processing circuitry configured to use the sensor data to derive the distribution of mass, the processing circuitry configured to use the distribution of mass to determine changes to the mass distribution which would yield a different wake performance level; and
    a display coupled to the processing circuitry, the processing circuitry being configured to use the display to indicate changes to the mass distribution which would yield the different wake performance level.

11. A method of indicating how to affect performance level of a wakeboat that during operation creates a wake, the wakeboat having a hull, the wake performance level varying depending upon distribution of mass of and aboard the hull, the method comprising:
    supporting processing circuitry from the hull;
    supporting a sensor from the hull, configured to measure at least one parameter of the wakeboat, the sensor providing data to the processing circuitry, the processing circuitry configured to use the sensor data to derive the distribution of mass, the processing circuitry configured to use the distribution of mass to determine changes to the mass distribution which would yield a different wake performance level; and
    coupling a display to the processing circuitry, the processing circuitry being configured to cause the display to indicate changes to the mass distribution which would yield the different wake performance level.

12. The method of claim 11 wherein the sensor is configured to measure rotation of the hull around at least one axis, and wherein the processing circuitry is configured to derive the distribution of mass using data comprising the sensor measurement of hull rotation.

13. The method of claim 11 wherein the sensor is configured to measure depth of the hull in water, and wherein the processing circuitry derives the distribution of mass using data comprising the measurement of hull draft.

14. The method of claim 11 further comprising providing at least one passenger aboard the wakeboat, wherein the indicated changes to the mass distribution comprise a suggestion as to how to reposition at least one passenger aboard the wakeboat.

15. The wakeboat of claim 11 wherein the sensor measures the distribution of mass via at least one of pressure, optical, thermal, ultrasonic, and capacitance.

16. The method of claim 11 wherein the wakeboat further comprises at least one ballast compartment supported by the hull, wherein the indicated changes to the mass distribution comprise at least one of adding and removing ballast from the ballast compartment.

17. The method of claim 16 wherein the processing circuitry is further configured to selectively change the mass distribution by at least one of automatically adding and automatically removing ballast from the ballast compartment.

18. The method of claim 11 wherein the wakeboat further comprises at least one ballast compartment supported by the hull, wherein the indicated changes to the mass distribution comprise relocating the ballast compartment.

19. The method of claim 11 wherein the wakeboat further comprises a hydrodynamic control surface supported by the hull, the hydrodynamic control surface selectively changing the effect of the distribution of mass on the wake performance level while the hull is in motion in water, the processing circuitry incorporating the effect of the hydrodynamic control surface in the indicated changes to the mass distribution.

* * * * *